United States Patent
Kuwabara

(10) Patent No.: US 11,294,961 B2
(45) Date of Patent: Apr. 5, 2022

(54) INFORMATION SEARCH APPARATUS, SEARCH PROGRAM, DATABASE UPDATE METHOD, DATABASE UPDATE APPARATUS AND DATABASE UPDATE PROGRAM, FOR SEARCHING A SPECIFIED SEARCH TARGET ITEM ASSOCIATED WITH SPECIFIED RELATION ITEM

(71) Applicant: KANAGAWA UNIVERSITY, Kanagawa (JP)

(72) Inventor: Tsuneo Kuwabara, Kanagawa (JP)

(73) Assignee: KANAGAWA UNIVERSITY, Kanagawa (JP)

( * ) Notice: Subject to any disclaimer, the term of this patent is extended or adjusted under 35 U.S.C. 154(b) by 112 days.

(21) Appl. No.: 16/483,442

(22) PCT Filed: May 11, 2018

(86) PCT No.: PCT/JP2018/018419
§ 371 (c)(1),
(2) Date: Aug. 4, 2019

(87) PCT Pub. No.: WO2018/212106
PCT Pub. Date: Nov. 22, 2018

(65) Prior Publication Data
US 2020/0012687 A1    Jan. 9, 2020

(30) Foreign Application Priority Data

May 19, 2017 (JP) .............................. JP2017-099789
May 9, 2018 (JP) .............................. JP2018-090308

(51) Int. Cl.
*G06F 16/00*    (2019.01)
*G06F 16/9032*    (2019.01)
(Continued)

(52) U.S. Cl.
CPC ...... *G06F 16/90328* (2019.01); *G06F 16/908* (2019.01); *G06F 16/9024* (2019.01); *G06F 16/90344* (2019.01)

(58) Field of Classification Search
None
See application file for complete search history.

(56) References Cited

U.S. PATENT DOCUMENTS 5,241,648 A * 8/1993 Cheng .................. G06F 16/2456
6,009,439 A * 12/1999 Shiomi .................... G06F 16/30
(Continued)

FOREIGN PATENT DOCUMENTS

GB    2357605 A    6/2001
JP    H10-011469 A    1/1998
(Continued)

OTHER PUBLICATIONS

WIPO, International Search Report for PCT Application No. PCT/JP2018/018419, dated Jun. 19, 2018.

*Primary Examiner* — Polina G Peach

(57) ABSTRACT

Data searching apparatus to speed up searching time. This apparatus searches search target items associated with the specified relation items. When a group of search target items is associated with a same group of relation items, an upper item is defined to both of the groups of search target items and relation items. The relation between the upper item and relation items are recorded on first data, whereas the relation between the upper item and search target items are recorded on second data. The relations between the relation items and search items which are not associated with the upper items are recorded in third data. When part of or all of the specified relation items is contained in the first data, the first data, at
(Continued)

least the second data is searched, and when no specified relation item is contained on the first data, only the third data is searched.

13 Claims, 39 Drawing Sheets

(51) Int. Cl.
*G06F 16/903* (2019.01)
*G06F 16/901* (2019.01)
*G06F 16/908* (2019.01)
*G06F 16/30* (2019.01)

(56) References Cited

U.S. PATENT DOCUMENTS

| | | | | |
|---|---|---|---|---|
| 6,182,062 | B1* | 1/2001 | Fujisawa | G06F 16/243 |
| 6,622,126 | B1 | 9/2003 | McArdle et al. | |
| 7,702,640 | B1* | 4/2010 | Vermeulen | G06F 16/2272 |
| | | | | 707/999.1 |
| 8,166,021 | B1* | 4/2012 | Cao | G06F 40/289 |
| | | | | 707/713 |
| 8,452,755 | B1* | 5/2013 | Ye | G06F 16/38 |
| | | | | 707/715 |
| 9,092,484 | B1* | 7/2015 | Abraham | G06F 16/24542 |
| 9,171,073 | B1 | 10/2015 | Ye et al. | |
| 9,703,829 | B2* | 7/2017 | Isomatsu | G06F 16/2228 |
| 2001/0010048 | A1* | 7/2001 | Kobayashi | G06F 16/90344 |
| 2003/0135495 | A1* | 7/2003 | Vagnozzi | G06F 16/31 |
| 2003/0195873 | A1* | 10/2003 | Lewak | G06F 16/242 |
| 2004/0044662 | A1* | 3/2004 | Ganesan | G06F 16/24542 |
| 2005/0097084 | A1* | 5/2005 | Balmin | G06F 16/8365 |
| 2006/0074857 | A1* | 4/2006 | Etzold | G16H 70/00 |
| 2007/0136274 | A1* | 6/2007 | Takuma | G06F 16/30 |
| 2007/0192306 | A1* | 8/2007 | Papakonstantinou | |
| | | | | G06F 16/951 |
| 2008/0183688 | A1* | 7/2008 | Chamdani | G06F 16/2453 |
| 2009/0228514 | A1* | 9/2009 | Liu | G06F 16/8365 |
| 2009/0228528 | A1* | 9/2009 | Ercegovac | G06F 16/319 |
| 2010/0030801 | A1* | 2/2010 | Takayama | G06F 16/284 |
| | | | | 707/802 |
| 2010/0088428 | A1* | 4/2010 | Hendrickson | H03M 7/04 |
| | | | | 709/242 |
| 2012/0166440 | A1* | 6/2012 | Shmueli | G06F 16/322 |
| | | | | 707/737 |
| 2014/0143549 | A1* | 5/2014 | Araki | G06F 16/322 |
| | | | | 713/175 |
| 2014/0358894 | A1* | 12/2014 | Wei | G06F 16/2453 |
| | | | | 707/713 |
| 2015/0234872 | A1 | 8/2015 | Iijima et al. | |
| 2016/0179981 | A1* | 6/2016 | Enoki | G06F 16/319 |
| | | | | 707/800 |
| 2017/0068732 | A1* | 3/2017 | Newman | G06F 16/24542 |
| 2019/0228314 | A1* | 7/2019 | Nagato | G06N 20/20 |
| 2019/0251069 | A1* | 8/2019 | Walker | G06F 16/2282 |

FOREIGN PATENT DOCUMENTS

| | | |
|---|---|---|
| JP | 2001-216307 A | 8/2001 |
| JP | 2002157407 A | 5/2002 |
| JP | 2005-099938 A | 4/2005 |
| JP | 2007-310842 A | 11/2007 |
| JP | 2009-086815 A | 4/2009 |
| JP | 4853797 B2 | 1/2012 |
| WO | 2014/167702 A1 | 10/2014 |

* cited by examiner

FIG. 3

| customer identification number | goods name |
|---|---|
| 1 | a |
| 1 | b |
| 1 | c |
| 2 | a |
| 2 | c |
| 3 | b |
| 4 | a |
| 4 | c |
| 5 | a |
| . . . | . . . |
| 10 | d |
| . . . | . . . |

FIG. 4

| upper item | goods name |
|---|---|
| W | a |
| W | b |
| X | a |
| X | c |
| Y | b |
| Y | c |
| Z | a |
| Z | b |
| Z | c |

FIG. 5

| customer identification number | upper item or goods name |
|---|---|
| 1 | z |
| 2 | X |
| 3 | b |
| 4 | X |
| 5 | a |
| . | . |
| . | . |
| . | . |
| 10 | d |
| . | . |
| . | . |
| . | . |

FIG. 6

| customer identification number | upper item |
|---|---|
| 1 | Z |
| 2 | X |
| 4 | X |
| 6 | W |
| 7 | Y |
| . | . |
| . | . |
| . | . |

FIG. 7

| customer identification number | goods name |
|---|---|
| 3 | b |
| 5 | a |
| 8 | c |
| . . . | . . . |
| 10 | d |
| . . . | . . . |

FIG. 12

| second upper item | upper item |
|---|---|
| α | W |
| α | X |
| α | Y |

FIG. 13

| customer identification number | second upper item |
|---|---|
| 1 | α |
| 9 | α |
| . | . |
| . | . |
| . | . |
| . | . |

FIG. 14

| upper item | goods name |
|---|---|
| W | a |
| W | b |
| X | a |
| X | c |
| Y | b |
| Y | c |

FIG. 15

| customer identification number | upper item |
|---|---|
| 2 | X |
| 4 | X |
| 6 | W |
| 7 | Y |
| . | . |
| . | . |
| . | . |
| . | . |

FIG. 16

| table name | hierarchy | referred table |
|---|---|---|
| third data table | 1 | |
| second data table | 2 | first data table |
| fifth data table | 3 | fourth data table |

FIG. 17

| customer identification number | goods name |
|---|---|
| 1 | a |
| . . . | . . . |
| 40000 | a |
| 20001 | b |
| . . . | . . . |
| 60000 | b |

FIG. 18

| upper item | goods name |
|---|---|
| W | a |
| W | b |

FIG. 19

| customer identification number | goods name or upper item |
|---|---|
| 1 | a |
| . | . |
| . | . |
| . | . |
| 20000 | a |
| 20001 | W |
| . | . |
| . | . |
| . | . |
| 40000 | W |
| 40001 | b |
| . | . |
| . | . |
| . | . |
| 60000 | b |

FIG. 20

| customer identification number | upper item |
|---|---|
| 20001 | W |
| . | . |
| . | . |
| . | . |
| 40000 | W |

FIG. 21

| customer identification number | goods name |
|---|---|
| 1 | a |
| . | . |
| . | . |
| . | . |
| 20000 | a |
| 40001 | b |
| . | . |
| . | . |
| . | . |
| 60000 | b |

FIG. 23A

| customer identification number | goods name |
|---|---|
| 10 | d |
| . | . |
| . | . |
| . | . |

FIG. 23B

| customer identification number | goods name |
|---|---|
| 3 | b |
| 5 | a |
| 8 | c |
| . | . |
| . | . |
| . | . |

FIG. 25

| upper item | goods name |
|---|---|
| Z | a |
| Z | b |
| Z | c |

FIG. 26

| customer identification number | upper item |
|---|---|
| 1 | Z |
| . | . |
| . | . |
| . | . |
| 500 | Z |

FIG. 27

| customer identification number | goods name |
|---|---|
| 1 | d |
| . | . |
| . | . |
| . | . |
| 1000 | d |

FIG. 28

| customer identification number | goods name |
|---|---|
| 501 | b |
| . | . |
| . | . |
| . | . |
| 800 | b |
| 601 | c |
| . | . |
| . | . |
| . | . |
| 900 | c |

FIG. 29

| customer identification number | goods name |
|---|---|
| 1 | d |
| . . . | . . . |
| 1000 | d |
| 501 | b |
| . . . | . . . |
| 800 | b |
| 601 | c |
| . . . | . . . |
| 900 | c |

FIG. 30

| customer identification number | upper item |
|---|---|
| 1 | Z |
| . | . |
| . | . |
| . | . |
| 500 | Z |
| 750 | Z |
| . | . |
| . | . |
| . | . |
| 800 | Z |

FIG. 31

| customer identification number | goods name |
|---|---|
| 501 | b |
| . | . |
| . | . |
| . | . |
| 749 | b |
| 601 | c |
| . | . |
| . | . |
| . | . |
| 749 | c |
| 801 | c |
| . | . |
| . | . |
| . | . |
| 900 | c |
| 801 | a |
| . | . |
| . | . |
| . | . |
| 850 | a |

FIG. 32

| customer identification number | goods name |
|---|---|
| 1 | d |
| . | . |
| . | . |
| . | . |
| 1000 | d |
| 501 | b |
| . | . |
| . | . |
| . | . |
| 749 | b |
| 601 | c |
| . | . |
| . | . |
| . | . |
| 749 | c |
| 801 | c |
| . | . |
| . | . |
| . | . |
| 900 | c |
| 801 | a |
| . | . |
| . | . |
| . | . |
| 850 | a |

FIG. 33

| customer identification number | goods name |
|---|---|
| 1 | a |
| . . . | . . . |
| 40000 | a |
| 20001 | b |
| . . . | . . . |
| 60000 | b |
| 60001 | c |
| . . . | . . . |
| 70000 | c |

FIG. 34

| upper item | goods name |
|---|---|
| W | a |
| W | b |

FIG. 35

| customer identification number | goods name or upper item |
|---|---|
| 1 | a |
| . | . |
| . | . |
| . | . |
| 20000 | a |
| 20001 | W |
| . | . |
| . | . |
| . | . |
| 40000 | W |
| 40001 | b |
| . | . |
| . | . |
| . | . |
| 60000 | b |
| 60001 | c |
| . | . |
| . | . |
| . | . |
| 70000 | c |

FIG. 36

| customer identification number | upper item |
|---|---|
| 20001 | W |
| . | . |
| . | . |
| . | . |
| 40000 | W |

FIG. 37A

| customer identification number | goods name |
|---|---|
| 60001 | c |
| . | . |
| . | . |
| . | . |
| 70000 | c |

FIG. 37B

| customer identification number | goods name |
|---|---|
| 1 | a |
| . | . |
| . | . |
| . | . |
| 20000 | a |
| 40001 | b |
| . | . |
| . | . |
| . | . |
| 60000 | b |

INFORMATION SEARCH APPARATUS, SEARCH PROGRAM, DATABASE UPDATE METHOD, DATABASE UPDATE APPARATUS AND DATABASE UPDATE PROGRAM, FOR SEARCHING A SPECIFIED SEARCH TARGET ITEM ASSOCIATED WITH SPECIFIED RELATION ITEM

TECHNICAL FIELD

The present invention relates to a data structure of a database, an information search apparatus and a search program for the database, and an update method, an update apparatus and an update program for the database, which are used for a computer to search a search target item associated with a relation item specified among a plurality of relation items from among a plurality of search target items.

BACKGROUND ART

Conventionally, a narrow-down goods search system are known such that, for example, when searching for goods at an online supermarket, a customer first selects any of previous-selection items (the relation items: "Beef", "Pork", "Chicken") from previous-selection categories (types of meat) and then selects (specifies) any of after-selection items (relation items: "Sirloin meat", "Tongue meat", "Fillet meat", "Thigh meat", "Shoulder meat", "Chicken breast strips", "Liver meat") from after-selection categories (types of part), thereby goods corresponding to the selected selection item (the search target item: for example, thigh meat of beef) is displayed.

In Patent Literature 1, a data structure which includes a data table in which several previous-selection items (the relation items) are grouped by upper classes (upper items) in order to reduce duplication of previous-selection items which are associated in duplicate with previous-selection items, is disclosed. This data structure also includes a data table in which the after-selection items (the relation items) are associated with the previous-selection items and the upper classes.

For example, with regard to the previous-selection categories (types of meat), the previous-selection items of "Beef" and "Pork" are grouped in the upper class of "Mammals". Furthermore, the upper class of "Mammals" and the previous-selection item of "Chicken" are grouped in the upper class of "Animals (meat)". In this case, a data table as shown in Table 1 below is created. On the other hand, the after-selection categories (types of part) is associated with the above-mentioned upper classes ("Mammals", "Animals (meat)") or the previous-selection item ("Beef", "Pork", "Chicken"), and a data table as shown in Table 2 below is created. By using these data tables, for example, when "Beef" is selected as the previous-selection item, "Mammals" associated with "Beef" and "Animals (meat)" associated with the "Mammals" are selected from the data table of Table 1 below. After that, the part of the meat associated with any of the "Mammals", the "Animals (meat)" and further the selected "Beef", as a selected result, is extracted from the data table of Table 2 below and presented to a customer as an after-selection category. In response to this, when the customer selects "Thigh meat" as the after-selection item, the goods number (the search target item) associated with "Beef/Thigh meat" is searched from the data table as shown in Table 3 below, and a goods of "Thigh meat of beef" corresponding to the goods number 4 is presented to the customer.

TABLE 1

| Mammals | Beef |
| Mammals | Pork |
| Animals (meat) | Mammals |
| Animals (meat) | Chicken |

TABLE 2

| Beef | Sirloin meat |
| Beef | Tongue meat |
| Chicken | Chicken breast strips |
| Mammals | Fillet meat |
| Mammals | Shoulder meat |
| Animals (meat) | Thigh meat |
| Animals (meat) | Liver meat |

TABLE 3

| Beef | Fillet meat | goods number 1 |
| Beef | Shoulder meat | goods number 2 |
| Beef | Sirloin meat | goods number 3 |
| Beef | Thigh meat | goods number 4 |
| Beef | Tongue meat | goods number 5 |
| Beef | Tongue meat | goods number 6 |
| Beef | Liver meat | goods number 7 |
| Pork | Fillet meat | goods number 8 |
| Pork | Shoulder meat | goods number 9 |
| Pork | Shoulder meat | goods number 10 |
| Pork | Thigh meat | goods number 11 |
| Pork | Liver meat | goods number 12 |
| Chicken | Chicken breast strips | goods number 13 |
| Chicken | Chicken breast strips | goods number 14 |
| Chicken | Thigh meat | goods number 15 |
| Chicken | Liver meat | goods number 16 |

CITATION LIST

Patent Literature

Patent Literature 1: Japanese Patent No. 4853797.

SUMMARY OF THE INVENTION

Problems to be Solved by the Invention

Recently, an importance of speeding up processing is increasing in search processing for searching a search target item associated with a relation item specified from among a plurality of relation items by using a computer from among a plurality of search target items. In particular, the number of search target items and the number of relation items stored in various databases are enormous according to the recent increase in processing power and storage capacity of computers, while the speed of improvement in computer processing power is slow down, and as a result it is desirable to realize faster search processing by a more efficient search method.

The final purpose in the example shown in the Patent Literature 1 is to search the target goods number from the data table as shown in Table 3 in which the number of records is overwhelmingly larger than the data table as shown in Tables 1 and 2 only for recording a section of the goods class. That is, in the data structure disclosed in the Patent Literature 1, the data table used to search the search target item (for example, the goods number of "Thigh meat of beef") associated with the specified relation item (selected previous-selection item (for example, "Beef") and the selected after-selection item (for example, "Thigh meat") does not differ from a general data structure in which each search target item and each after-selection item (the previous-selection item and the after-selection item) related the search target item are associated as shown in Table 3. Therefore, in the search processing using the data structure disclosed in the Patent Literature 1, the speed of the search processing cannot be increased.

Means for Solving the Problems

A data structure according to an aspect of the present invention is a data structure of a database for searching a search target item associated with a relation item specified from among a plurality of relation items by using a computer from among a plurality of search target items, and includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other.

In the data structure, when a search is performed under a predetermined search condition in which one or more relation items are specified from among the plurality of relation items, the computer may refer to the first data, and if it is decided that there is the upper item associated with part or all of the one or more relation items, at least the second data may be searched, and if it is decided that there is not the associated upper item, only the third data may be searched.

The database used for the search has the data structure including the first data, the second data and the third data described above, thereby the speeding up of the search processing can be realized.

Specifically, in the database having the data structure according to this aspect, referring to the first data, the search target item related to the specified relation item (specified-relation item) is searched from the second data in which the upper items associated with two or more relation items and the search target items are associated with each other, and the third data in which the search target item and the relation item not associated with the first data and the second data are associated with each other.

Since the second data is obtained by combining two or more relation items into the upper item and being associated with the search target items, the number of records in which both the second data and the third data are added together is smaller than the number of records in a database with a general data structure in which all the relationships between the relation items and the search target items are recorded only by the direct correspondence between the both items. Therefore, when using a database having the data structure according to this aspect, the search processing speed when searching for a search target item related to the specified-relation item from both the second data and the third data can be increased compared to using the database with the above general data structure.

Here, it should be especially noted in the data structure of this aspect that an exponential speeding-up can be expected in the case that a search processing is performed under search conditions in which two or more relation items are specified.

For example, in the case that search target items related to all of the two or more relation items associated with the same upper item in the first data are included in the second data and the specified two or more relation items are searched in AND condition, if these specified two or more relation items match the two or more relation items associated with the same upper item, the search processing can be completed only by searching the second data for the search target items associated with this upper item without searching the third data. Since the second data in this case includes only the search target items related to all of the two or more relation items associated with the upper items, the number of records is small, and the search processing speed can be much faster than using the database with the general data structure. Also, if the two or more specified relation items do not match the two or more relation items associated with the same upper item, the search processing can be completed only by searching the third data for the search target items associated with these two or more specified relation items in AND condition without searching the second data. Since the third data includes only the records that relate the search target items and the relation items which are not related in the first data and the second data, the number of records is small, and the search processing speed can be much faster than using the database with the general data structure.

Also, for example, in the case that the search target items related to at least one of the two or more relation items associated with the same upper item in the first data are included in the second data and the specified two or more relation items are searched in OR condition, if these specified two or more relation items are included in the two or more relation items associated with the same upper item, the search processing can be completed only by searching the second data for the search target items associated with the upper item without searching the third data. Since the second data in this case includes only the search target items related to at least one of the two or more relation items associated with the upper item, the number of records is small, and the search processing speed can be much faster than using the database with the general data structure. Also, in this case, if none of the specified two or more relation items is included in the two or more relation items associated with the same upper item, the search processing can be completed only by searching the third data for the search target items associated with these two or more specified relation items in OR condition without searching the second data. Since the third data does not include the records that relate the search target items and the relation items which are not related in the first data and the second data, the number of records is small, and the search processing speed can be much faster than using the database with the general data structure. However, a table of second data (hereinafter referred to as "table B") in which search target items related to at least one of two or more relation items associated with the same upper item in the first data are recorded in association with this upper item is desirable to record in a separate table from a table of second data (hereinafter referred to as "table A") in which search target items related to all of two or more relation items associated with the same upper item in the first data are recorded in association with this upper item. Because, if these two tables are recorded in the same table in spite of the relationship between the two tables is different in content, the difference of the two tables cannot be distinguished. In addition, search target items related to at least one of two or more relation items associated with the same upper item in the first data naturally include search target items related to all of the two or more relation items associated with the same upper item in the first data. Therefore, it is desirable from the viewpoint of preventing duplicate recording of data that records recorded in the table A are not recorded in the table B.

Thus, as a result of speeding up the search processing under the predetermined search conditions as described above, an expected value of the search processing speed in the case of using the database having the data structure according to the present aspect can be much faster than using the database with the general data structure.

Then, according to the data structure according to the present aspect, it is possible to increase a frequency of performing search processing for the second data that can be searched under a single condition by appropriately designing two or more relation items to be associated with upper items in anticipation of such a predetermined search condition. When the number of records is the same, search processing for the second data that can be searched under a single condition can be performed faster than search processing for the third data that is searched under AND condition or OR condition. Therefore, the expected value of the search processing speed is further improved.

Further, in the data structure, the first data may be one in which the same upper item is associated with two or more relation items satisfying a predetermined upper item creation condition.

In the present invention, although upper item creation condition for selecting two or more relation items associated with the same upper item is appropriately set, for example, when the number of records is efficiently reduced to increase search processing speed, if a condition in which the number of search target items related to all of two or more relation items is a predetermined number or more is satisfied, the same upper item may be associated with these two or more relation items. Further, in order to speed up the search processing speed under a predetermined search condition, the same upper item may be associated with two or more relation items satisfying a condition that is selected, for example, in anticipation of two or more relation items specified in the future by a predetermined search condition from a history of the specified relation items in the past search processing.

Further, the data structure may include fourth data in which the same second upper item is associated with two or more upper items among the plurality of the above-mentioned upper items, and fifth data in which the second upper item is associated with search target items related to relation items associated via the upper item with the same second upper item among the plurality of search target items. Further, when a search is performed under a predetermined search condition in which two or more relation items are specified from among the plurality of relation items, the computer refers to the fourth data, and if it is decided that there is a second upper item associated via the upper item with two or more relation items satisfying the predetermined search condition, the fifth data may be searched.

According to the data structure according to the present aspect, the database used for the search has a data structure including the fourth data and the fifth data in addition to the first data, the second data and the third data described above, thereby it is possible to realize further speeding up of the search processing. In particular, if the specified relation item matches two or more relation items associated with the upper item associated with the same second upper item in the fourth data, the search processing can be completed only by searching the fifth data for the search target items associated with this second upper item with referring to the forth data, without searching the second data and the third data. The number of records of the fifth data is smaller than the number of records of the second data, and the search processing speed can be further increased. Then, according to the data structure according to the present aspect, by appropriately designing the relation items to be associated with the second upper item in anticipation of a predetermined search condition of the relation items to be specified, the search processing speed can be further increased.

A data structure according to another aspect of the present invention is a data structure of a database for searching a search target item associated with a relation item specified from among a plurality of relation items by using a computer from among a plurality of search target items, and includes sixth data in which a upper item associated with two or more search target items among the plurality of search target items is associated with a relation item related to the two or more search target items, and seventh data in which a relation item not included in the sixth data and a search target item related to this relation item are associated with each other. The data structure further may include eighth data in which the same upper item is associated with two or more search target items among the plurality of search target items, the computer may refer to the sixth data, and if it is decided that there is the upper item associated with the specified relation item, the search target item associated with the upper item may be extracted from the eighth data and this search target item may be output as a search result, and the computer may refer to the seventh data, and if it is decided that there is the search target item related to the specified relation item, this search target item may be output as a search result.

According to the data structure of this aspect, the database used for the search has a data structure including the sixth data and the seventh data (preferably, also the eighth data) described above, thereby it is possible to realize further speeding up of the search processing.

Specifically, in the database having the data structure according to this aspect, the search target item related to the specified relation item (specified-relation item) is searched from the sixth data in which the upper item associated with two or more search target items is associated with the relation items related to the two or more search target items and the seventh data in which the relation item not included in the sixth data and the search target item are associated with each other.

Since the sixth data is obtained by combining two or more search target items into the upper item and being associated with the relation items, the number of records in which both the sixth data and the seventh data are added together is smaller than the number of records in a database with a general data structure in which all the relationships between the relation items and the search target items are recorded only by the direct correspondence between the both items. Therefore, when using a database having the data structure according to this aspect, the search processing speed when searching for a search target item related to the specified-relation item from both the sixth data and the seventh data can be increased compared to using the database with the above general data structure.

Furthermore, in the data structure according to this aspect, it is possible to expect an increase in search processing speed, for example, when a search target item is searched by specifying a single relation item. This is because when the relation item included in the sixth data and the relation item included in the seventh data have an exclusive relationship, if the relation item is specified among the sixth data and the seventh data, the search processing can be completed only by searching only one of the data including the relation item. In particular, since the sixth data includes only search target items related to all of the two or more search target items associated with the upper items, the number of records is small, and the search processing speed can be much faster than using the database with the general data structure.

Thus, as a result of speeding up the search processing under the predetermined search conditions as described above (for example, when a search target item is searched by specifying a single relation item), an expected value of the search processing speed in the case of using the database having the data structure according to the present aspect can be much faster than using the database with the general data structure.

In addition, an information search apparatus according to still another aspect of the present invention is an information search apparatus for searching a search target item associated with a relation item specified from among a plurality of relation items by using a computer from among a plurality of search target items, and for searching using the database having the above data structure. In the information search apparatus, when a search is performed under a predetermined search condition in which one or more relation items are specified from among the plurality of relation items, the computer may refer to the first data, and if it is decided that there is an upper item associated with part or all of the one or more relation items, at least the second data may be searched, and if it is decided that there is not this upper item, only the third data may be searched.

According to the information search apparatus of the present aspect, high-speed search processing can be performed.

In the information search apparatus, the first data may be one in which the same upper item is associated with two or more relation items satisfying a predetermined upper item creation condition.

In the information search apparatus according to this aspect, although upper item creation condition for selecting two or more relation items associated with the same upper item is appropriately set, for example, when the number of records is efficiently reduced to increase search processing speed, if a condition in which the number of search target items related to all of two or more relation items is a predetermined number or more is satisfied, the same upper item may be associated with these two or more relation items. Further, in order to speed up the search processing speed under a predetermined search condition, the same upper item may be associated with two or more relation items satisfying a condition that is selected, for example, in anticipation of two or more relation items specified in the future by a predetermined search condition from a history of the specified relation items in the past search processing.

According to the information search apparatus of the present aspect, high-speed search processing can be performed.

In the information search apparatus, the database may include fourth data in which the same second upper item is associated with two or more upper items among the plurality of the above-mentioned upper items, and fifth data in which the second upper item is associated with search target items related to relation items associated via the upper item with the same second upper item among the plurality of search target items, and when a search is performed under a predetermined search condition in which two or more relation items are specified from among the plurality of relation items, the computer refers to the fourth data, and if it is decided that there is a second upper item associated via the upper item with two or more relation items satisfying the predetermined search condition, the fifth data may be searched.

According to the information search apparatus of the present aspect, it is possible to further speed up the search processing in the case where the search is performed under a predetermined search condition in which two or more relation items are specified.

Further, in the information search apparatus, when performing a search under a predetermined search condition in which two or more relation items are specified from the plurality of relation items, the computer refers to the first data, and if it is decided that there is an upper item associated with two or more relation items matching the predetermined search condition, at least the second data may be searched, and if it is decided that there is not the upper item associated with the two or more relation items matching the predetermined search condition, the third data may be searched.

According to the information search apparatus of the present aspect, it is possible to speed up the search processing when a search is performed under a predetermined search condition in which two or more relation items are specified.

In addition, the information search apparatus according to still another aspect of the present invention is an information search apparatus for searching a search target item associated with a relation item specified from among a plurality of relation items by using a computer from among a plurality of search target items, and for searching using a database having a data structure that includes sixth data in which a upper item associated with two or more search target items among the plurality of search target items is associated with a relation item related to the two or more search target items, seventh data in which a relation item not included in the sixth data and a search target item related to this relation item are associated with each other, and eighth data in which the same upper item is associated with two or more search target items among the plurality of search target items, the computer refers to the sixth data, and if it is decided that there is the upper item associated with the specified relation item, the search target item associated with the upper item is extracted from the eighth data and this search target item is output as a search result, and the computer refers to the seventh data, and if it is decided that there is the search target item related to the specified relation item, this search target item is output as a search result.

In addition, a search program according to still another aspect of the present invention causes a computer to execute a step of searching, from among a plurality of search target items, a target item associated with a relation item specified from among a plurality of relation items, and in the step, a search is performed using the database having the above data structure. The step may use a database having a data structure that includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other, and when a search is performed under a predetermined search condition in which one or more relation items are specified from among the plurality of relation items, the step may cause the computer to refer to the first data, and if it is decided that there is an upper item associated with part or all of the one or more relation items, at least the second data may be searched, and it is decided that there is not this upper item, only the third data may be searched. In addition, the step may use a database having a data structure that includes sixth data in which a upper item associated with two or more search target items among the plurality of search target items is associated with a relation item related to the two or more search target items, seventh data in which a relation item not included in the sixth data and a search target item related to this relation item are associated with each other, and eighth data in which the same upper item is associated with two or more search target items among the plurality of search target items, the computer may refer to the sixth data, the step may cause the computer to refer to the sixth data, and if it is decided that there is the upper item associated with the specified relation item, the search target item associated with the upper item may be extracted from the eighth data and this search target item is output as a search result, and the step may cause the computer to refer to the seventh data, and if it is decided that there is the search target item related to the specified relation item, this search target item is output as a search result.

According to the search program of the present aspect, high-speed search processing can be performed.

In addition, a database manufacturing method (a database update method) according to still another aspect of the present invention is a manufacturing method (update method) of a database having the above data structure and includes an adding step for adding search target items and relation items related thereto, and an updating step for associating the same upper item with two or more relation items or two or more search target items, satisfying a predetermined upper item creation condition, to update the database.

Also, a database manufacturing apparatus (update apparatus) according to still another aspect of the present invention is a manufacturing apparatus (updating apparatus) of a database having the above data structure and includes an adding portion for adding search target items and relation items related thereto, and an updating portion for associating the same upper item with two or more relation items or two or more search target items, satisfying a predetermined upper item creation condition, to update the database.

The database is a database used for an information search apparatus for searching a search target item associated with a relation item specified from among a plurality of relation items by a computer from among a plurality of search target items, and may include first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other.

Further, the database may include sixth data in which a upper item associated with two or more search target items among the plurality of search target items is associated with a relation item related to the two or more search target items, seventh data in which a relation item not included in the sixth data and a search target item related to this relation item are associated with each other, and eighth data in which the same upper item is associated with two or more search target items among the plurality of search target items, the updating step or updating portion may use adding means for adding search target items and relation items related thereto and may associate the same upper item with two or more search target items satisfying a predetermined upper item creation condition to update the database.

Also, a database manufacturing program (a database update program) according to still another aspect of the present invention is a database manufacturing (updating) program for causing a computer to execute a step of manufacturing (updating) a database having the above data structure, and for causing the computer to execute an adding step for adding search target items and relation items related thereto and an updating step for associating the same upper item with two or more relation items or two or more search target items, satisfying a predetermined upper item creation condition to update the database. The database may have a data structure including first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other. Further, the database may be a database having a data structure that includes sixth data in which a upper item associated with two or more search target items among the plurality of search target items is associated with a relation item related to the two or more search target items, seventh data in which a relation item not included in the sixth data and a search target item related to this relation item are associated with each other and eighth data in which the same upper item is associated with two or more search target items among the plurality of search target items.

In these database manufacturing methods (update methods), two or more relation items or two or more search target items for which a predetermined upper item creation condition is satisfied by adding search target items and relation items related thereto are associated the same upper item, to update the database. The predetermined upper item creation condition may be set as appropriate. For example, in the case of attempting to accelerate search processing speed by reducing the number of records, if the number of search target items related to all of two or more relation items or two or more search target items becomes a predetermined number or more, the same upper item may be associated with the two or more relation items. In addition, in order to speed up the search processing speed under a predetermined search condition for the database having the above data structure, for example, the same upper item may be associated with two or more relation items satisfying a condition that is selected, in anticipation of two or more relation items specified in the future by a predetermined search condition from a history of the specified relation items in the past search processing.

In the above-described information search apparatus, there is an apparatus for using a database having a data structure that includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other. In this information search apparatus, when a search is performed under a predetermined search condition in which one or more relation items are specified from among the plurality of relation items, the computer refers to the first data, and if it is decided that there is an upper item associated with part or all of the one or more relation items, at least the second data is searched, and if it is decided that there is not this upper item, only the third data is searched. According to this, the search processing speed can be increased more than in the conventional case.

However, when new records (relation items and search target items related to each other) are input to the database having the data structure which has from the first data to the third data, it may be necessary to update the database by deleting the record in the third data and adding the record to the second data. This is the case when, for example, in the case where two relation items are associated with the same upper item, when a record including one of the relation items and a search target item exists in the third data, a record including this search target item and another of the relation items is newly input. In this case, it is necessary to delete the record from third data and add the record of the upper item and the search target item to second data.

Due to the need for such an update process, it is necessary to decide whether or not the update process is necessary for each new record input. In this decision, it is necessary to search all the records included in the third data based on the new record and decide whether or not the update process is necessary, and when the number of records included in the third data increases, there is a problem that the search for the third data takes time and the update process takes time.

A data structure according to still another aspect of the present invention is a data structure of a database for searching a search target item associated with a relation item specified from among a plurality of relation items by using a computer from among a plurality of search target items, and includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other, and the third data is divided into third data A in which the relation item not associated with any of the upper items is associated with the search target item and third data B in which the relation item associated with the upper item is associated with the search target item.

The data structure of this aspect is a data structure in which the third data in which relation items not associated with the first data and second data and search target items are associated with each other is divided into the third data A and the third data B.

The third data A includes, among the records included in the third data, the record in which the relation item not associated with any of the upper items is associated with the search target item. In such a record, even if a record of the same search target item as the search target item of the record is newly input, the relation items of these records are never associated with the same upper item. Therefore, when a new record is input, it is not necessary to search for the third data A, and in order to decide whether it is necessary to perform an update process of deleting the record included in the third data and adding the record to the second data, it is not necessary to search the third data A.

On the other hand, the third data B includes, among the records included in the third data, the record in which the relation item associated with the upper item is associated with the search target item. Such a record is such that, when a record of the same search target item as the search target item of the record is newly input, the relation items of these records can be associated with the same upper item. Therefore, when a new record is input, in order to decide whether the above update process is necessary, it is necessary to search the third data B. Also, the third data B may include a record that does not need to be searched when a new record is input and it is decided whether the update process is necessary.

According to the data structure of this aspect, in order to decide whether the above update process is necessary, it is sufficient to search only the third data B which is a part of the third data without searching the whole of the third data by collecting the records that do not need to be searched into the third data A. Therefore, since the number of records to be searched is smaller than in the conventional database in which the whole of the third data needs to be searched, the search time is shortened and the time required for the update process can be shortened.

Moreover, if it is decided that the update process is necessary, the records is deleted from the third data B, so the number of records of the third data B to be searched does not increase significantly, and the shortening of the update process is temporally realized.

Further, in the above-described information search apparatus, there is an apparatus using a database having a data structure that includes sixth data in which a upper item associated with two or more search target items among the plurality of search target items is associated with a relation item related to the two or more search target items, seventh data in which a relation item not included in the sixth data and a search target item related to this relation item are associated with each other, and eighth data in which the same upper item is associated with two or more search target items among the plurality of search target items. In this information search apparatus, the computer refers to the sixth data, and if it is decided that there is the upper item associated with the specified relation item, the search target item associated with the upper item is extracted from the eighth data and this search target item is output as a search result, and the computer refers to the seventh data, and if it is decided that there is the search target item related to the specified relation item, this search target item is output as a search result. Even with this information search apparatus, the search processing speed can be increased as compared to the prior art.

The above-mentioned problem that the update process takes time may similarly occur in a database having a data structure having from the sixth data to the eighth data.

A data structure according to another aspect of the present invention is a data structure of a database for searching a search target item associated with a relation item specified from among a plurality of relation items by using a computer from among a plurality of search target items, and includes sixth data in which a upper item associated with two or more search target items among the plurality of search target items is associated with a relation item related to the two or more search target items, seventh data in which a relation item not included in the sixth data and a search target item related to this relation item are associated with each other and eighth data in which the same upper item is associated with two or more search target items among the plurality of search target items, and the seventh data is divided into seventh data A in which the search target item not associated with any of the upper items is associated with the relation item and seventh data B in which the search target item associated with the upper item is associated with the relation item.

The data structure of this aspect is a data structure in which the seventh data in which relation items not associated with the sixth data and search target items relating thereto are associated with each other is divided into the seventh data A and the seventh data B.

The seventh data A includes, among the records included in the seventh data, the record in which the search target item not associated with any of the upper items is associated with the relation item. In such a record, even if a record of the same relation item as the relation item of the record is newly input, the search target items of these records are never associated with the same upper item. Therefore, when a new record is input, it is not necessary to search for the seventh data A. Thereby, in order to decide whether it is necessary to perform an update process of deleting the record included in the seventh data and adding the record to the sixth data, it is not necessary to search the seventh data A.

On the other hand, the seventh data B includes, among the records included in the seventh data, the record in which the search target item associated with the upper item is associated with the relation item. Such a record is such that, when a record of the same relation item as the relation item of the record is newly input, the search target items of these records can be associated with the same upper item. Therefore, when a new record is input, in order to decide whether the above update process is necessary, it is necessary to search the seventh data B. Also, the seventh data B may include a record that does not need to be searched when a new record is input and it is decided whether the update process is necessary.

According to the data structure of this aspect, in order to decide whether the above update process is necessary, it is sufficient to search only the seventh data B which is a part of the seventh data without searching the whole of the seventh data by collecting the records that do not need to be searched into the seventh data A. Therefore, since the number of records to be searched is smaller than in the conventional database in which the whole of the seventh data needs to be searched, the search time is shortened and the time required for the update process can be shortened.

Moreover, if it is decided that the update process is necessary, the records is deleted from the seventh data B, so the number of records of the seventh data B to be searched does not increase significantly, and the shortening of the update process is realized over time.

In addition, an information search apparatus according to still another aspect of the present invention is an information search apparatus for searching a search target item associated with a relation item specified from among a plurality of relation items by using a computer from among a plurality of search target items, and for searching using a database having a data structure that includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other, and the third data is divided into third data A in which the relation item not associated with any of the upper items is associated with the search target item and third data B in which the relation item associated with the upper item is associated with the search target item, and when a search is performed under a predetermined search condition in which one or more relation items are specified from among the plurality of relation items, the computer refers to the first data, and if it is decided that there is an upper item associated with part or all of the one or more relation items, at least the second data is searched, and if it is decided that there is not this upper item, only the third data is searched.

According to the information search apparatus of this aspect, in order to decide whether the above update process is necessary, it is sufficient to search only the third data B which is a part of the third data without searching the whole of the third data by collecting the records that do not need to be searched into the third data A. Therefore, since the number of records to be searched is smaller than in the conventional database in which the whole of the third data needs to be searched, the search time is shortened and the time required for the update process can be shortened.

In addition, the information search apparatus according to still another aspect of the present invention is an information search apparatus for searching a search target item associated with a relation item specified from among a plurality of relation items by using a computer from among a plurality of search target items, and for searching using a database having a data structure that includes sixth data in which a upper item associated with two or more search target items among the plurality of search target items is associated with a relation item related to the two or more search target items, seventh data in which a relation item not included in the sixth data and a search target item related to this relation item are associated with each other and eighth data in which the same upper item is associated with two or more search target items among the plurality of search target items, and the seventh data is divided into seventh data A in which the search target item not associated with any of the upper items is associated with the relation item and seventh data B in which the search target item associated with the upper item is associated with the relation item, the computer refers to the sixth data, and if it is decided that there is the upper item associated with the specified relation item, the search target item associated with the upper item is extracted from the eighth data and this search target item is output as a search result, and the computer refers to the seventh data, and if it is decided that there is the search target item related to the specified relation item, this search target item is output as a search result.

According to the information search apparatus of this aspect, in order to decide whether the database update process is necessary, it is sufficient to search only the seventh data B which is a part of the seventh data without searching the whole of the seventh data by collecting the records that do not need to be searched into the seventh data A. Therefore, since the number of records to be searched is smaller than in the conventional database in which the whole of the seventh data needs to be searched, the search time is shortened and the time required for the update process can be shortened.

Further, a database update method according to still another aspect of the present invention is a update method of a database to be used by an information search apparatus for searching a search target item associated with a relation item specified from among a plurality of relation items by using a computer from among a plurality of search target items, and to have a data structure that includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other, and the third data is divided into third data A in which the relation item not associated with any of the upper items is associated with the search target item and third data B in which the relation item associated with the upper item is associated with the search target item, and the database update method has an adding step in which, when the relation item not associated with any of the upper items and the search target item associated with this relation item are input, the record of this relation item and this search target item is added to the third data A, and when the relation item associated with the upper item and the search target item associated with this relation item are input, only the third data B of the third data is searched and thereby if a relation item which is associated with the above same upper item together with the relation item is found in the third data B regarding the same search target item as the search target item, the record of the search target item and the relation item is deleted from the third data B and a record in which the above same upper item is associated with the search target item is added to the second data, and if the relation item which is associated with the above same upper item together with the relation item is not found in the third data B, the input record is added to the third data B.

In the database update method of this aspect, the data structure in which the third data in which relation items not associated with the first data and second data and search target items are associated with each other is divided into the third data A and the third data B is used.

The third data A includes, among the records included in the third data, the record in which the relation item not associated with any of the upper items is associated with the search target item. In such a record, even if a record of the same search target item as the search target item of the record is newly input, the relation items of these records are never associated with the same upper item. Therefore, when a new record is input, it is not necessary to search for the third data A, and in order to decide whether it is necessary to perform an update process of deleting the record included in the third data and adding the record to the second data, it is not necessary to search the third data A.

On the other hand, the third data B includes, among the records included in the third data, the record in which the relation item associated with the upper item is associated with the search target item. Such a record is such that, when a record of the same search target item as the search target item of the record is newly input, the relation items of these records can be associated with the same upper item. Therefore, when a new record is input, in order to decide whether the above update process is necessary, it is necessary to search the third data B. Also, the third data B may include a record that does not need to be searched when a new record is input and it is decided whether the update process is necessary.

According to the database update method of this aspect, in order to decide whether the above update process is necessary, it is sufficient to search only the third data B which is a part of the third data without searching the whole of the third data by collecting the records that do not need to be searched into the third data A. Therefore, since the number of records to be searched is smaller than in the conventional database in which the whole of the third data needs to be searched, the search time is shortened and the time required for the update process can be shortened.

Moreover, if it is decided that the update process is necessary, the records is deleted from the third data B, so the number of records of the third data B to be searched does not increase significantly, and the shortening of the update process is temporally realized.

Also, a database update method according to still another aspect of the present invention is a update method of a database to be used by an information search apparatus for searching a search target item associated with a relation item specified from among a plurality of relation items by using a computer from among a plurality of search target items, and to have a data structure that includes sixth data in which a upper item associated with two or more search target items among the plurality of search target items is associated with a relation item related to the two or more search target items, seventh data in which a relation item not included in the sixth data and a search target item related to this relation item are associated with each other, and eighth data in which the same upper item is associated with two or more search target items among the plurality of search target items, and the seventh data is divided into seventh data A in which the search target item not associated with any of the upper items is associated with the relation target item and seventh data B in which the search target item associated with the upper item is associated with the relation item, and the database update method has an adding step in which, when the search target item not associated with any of the upper items and the relation item associated with this search target item are input, the record of this relation item and this search target item is added to the seventh data A, and when the search target item associated with the upper item and the relation item associated with this search target item are input, only the seventh data B of the seventh data is searched and thereby if a search target item which is associated with the above same upper item together with the search target item is found in the seventh data B regarding the same relation item as the relation item, the record of the relation item and the search target item is deleted from the seventh data B and a record in which the above same upper item is associated with the relation item is added to the sixth data, and if the relation item which is associated with the above same upper item together with the relation item is not found in the seventh data B, the input record is added to the seventh data B.

In the database update method of this aspect, the data structure in which the seventh data in which relation items not associated with the sixth data and search target items relating thereto are associated with each other is divided into the seventh data A and the seventh data B.

The seventh data A includes, among the records included in the seventh data, the record in which the search target item not associated with any of the upper items is associated with the relation item. In such a record, even if a record of the same relation item as the relation item of the record is newly input, the search target items of these records are never associated with the same upper item. Therefore, when a new record is input, it is not necessary to search for the seventh data A. Thereby, in order to decide whether it is necessary to perform an update process of deleting the record included in the seventh data and adding the record to the sixth data, it is not necessary to search the seventh data A.

On the other hand, the seventh data B includes, among the records included in the seventh data, the record in which the search target item associated with the upper item is associated with the relation item. Such a record is such that, when a record of the same relation item as the relation item of the record is newly input, the search target items of these records can be associated with the same upper item. Therefore, when a new record is input, in order to decide whether the above update process is necessary, it is necessary to search the seventh data B. Also, the seventh data B may include a record that does not need to be searched when a new record is input and it is decided whether the update process is necessary.

According to the database update method of this aspect, in order to decide whether the above update process is necessary, it is sufficient to search only the seventh data B which is a part of the seventh data without searching the whole of the seventh data by collecting the records that do not need to be searched into the seventh data A. Therefore, since the number of records to be searched is smaller than in the conventional database in which the whole of the seventh data needs to be searched, the search time is shortened and the time required for the update process can be shortened.

Moreover, if it is decided that the update process is necessary, the records is deleted from the seventh data B, so the number of records of the seventh data B to be searched does not increase significantly, and the shortening of the update process is temporally realized.

Further, a database update apparatus according to still another aspect of the present invention is a update apparatus of a database to be used by an information search apparatus for searching a search target item associated with a relation item specified from among a plurality of relation items by using a computer from among a plurality of search target items, and to have a data structure that includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other, and the third data is divided into third data A in which the relation item not associated with any of the upper items is associated with the search target item and third data B in which the relation item associated with the upper item is associated with the search target item, and the database update apparatus has adding means in which, when the relation item not associated with any of the upper items and the search target item associated with this relation item are input, the record of this relation item and this search target item is added to the third data A, and when the relation item associated with the upper item and the search target item associated with this relation item are input, only the third data B of the third data is searched and thereby if a relation item which is associated with the above same upper item together with the relation item is found in the third data B regarding the same search target item as the search target item, the record of the search target item and the relation item is deleted from the third data B and a record in which the above same upper item is associated with the search target item is added to the second data, and if the relation item which is associated with the above same upper item together with the relation item is not found in the third data B, the input record is added to the third data B.

According to the database update apparatus of this aspect, in order to decide whether the above update process is necessary, it is sufficient to search only the third data B which is a part of the third data without searching the whole of the third data by collecting the records that do not need to be searched into the third data A. Therefore, since the number of records to be searched is smaller than in the conventional database in which the whole of the third data needs to be searched, the search time is shortened and the time required for the update process can be shortened.

Also, a database update apparatus according to still another aspect of the present invention is a update apparatus of a database to be used by an information search apparatus for searching a search target item associated with a relation item specified from among a plurality of relation items by using a computer from among a plurality of search target items, and to have a data structure that includes sixth data in which a upper item associated with two or more search target items among the plurality of search target items is associated with a relation item related to the two or more search target items, seventh data in which a relation item not included in the sixth data and a search target item related to this relation item are associated with each other, and eighth data in which the same upper item is associated with two or more search target items among the plurality of search target items, and the seventh data is divided into seventh data A in which the search target item not associated with any of the upper items is associated with the relation target item and seventh data B in which the search target item associated with the upper item is associated with the relation item, and the database update apparatus has adding means in which, when the search target item not associated with any of the upper items and the relation item associated with this search target item are input, the record of this relation item and this search target item is added to the seventh data A, and when the search target item associated with the upper item and the relation item associated with this search target item are input, only the seventh data B of the seventh data is searched and thereby if a search target item which is associated with the above same upper item together with the search target item is found in the seventh data B regarding the same relation item as the relation item, the record of the relation item and the search target item is deleted from the seventh data B and a record in which the above same upper item is associated with the relation item is added to the sixth data, and if the relation item which is associated with the above same upper item together with the relation item is not found in the seventh data B, the input record is added to the seventh data B.

According to the database update apparatus of this aspect, in order to decide whether the above update process is necessary, it is sufficient to search only the seventh data B which is a part of the seventh data without searching the whole of the seventh data by collecting the records that do not need to be searched into the seventh data A. Therefore, since the number of records to be searched is smaller than in the conventional database in which the whole of the seventh data needs to be searched, the search time is shortened and the time required for the update process can be shortened.

Further, a database update program according to still another aspect of the present invention causes a computer to execute a process of updating a database to be used by an information search apparatus for searching a search target item associated with a relation item specified from among a plurality of relation items by using the computer from among a plurality of search target items, and to have a data structure that includes first data in which the same upper item is associated with two or more of relation items among the plurality of relation items, second data in which the search target item related to the relation item associated with the same upper item among the plurality of search target items is associated with the upper item, and third data in which the search target item and the relation item not associated with the first data and the second data are associated with each other, and the third data is divided into third data A in which the relation item not associated with any of the upper items is associated with the search target item and third data B in which the relation item associated with the upper item is associated with the search target item, and the database update program causes the computer to execute an adding step in which, when the relation item not associated with any of the upper items and the search target item associated with this relation item are input, the record of this relation item and this search target item is added to the third data A, and when the relation item associated with the upper item and the search target item associated with this relation item are input, only the third data B of the third data is searched and thereby if a relation item which is associated with the above same upper item together with the relation item is found in the third data B regarding the same search target item as the search target item, the record of the search target item and the relation item is deleted from the third data B and a record in which the above same upper item is associated with the search target item is added to the second data, and if the relation item which is associated with the above same upper item together with the relation item is not found in the third data B, the input record is added to the third data B.

According to the database update program of this aspect, in order to decide whether the above update process is necessary, it is sufficient to search only the third data B which is a part of the third data without searching the whole of the third data by collecting the records that do not need to be searched into the third data A. Therefore, since the number of records to be searched is smaller than in the conventional database in which the whole of the third data needs to be searched, the search time is shortened and the time required for the update process can be shortened.

Also, a database update program according to still another aspect of the present invention causes a computer to execute a process of updating a database to be used by an information search apparatus for searching a search target item associated with a relation item specified from among a plurality of relation items by using the computer from among a plurality of search target items, and to have a data structure that includes sixth data in which a upper item associated with two or more search target items among the plurality of search target items is associated with a relation item related to the two or more search target items, seventh data in which a relation item not included in the sixth data and a search target item related to this relation item are associated with each other, and eighth data in which the same upper item is associated with two or more search target items among the plurality of search target items, and the seventh data is divided into seventh data A in which the search target item not associated with any of the upper items is associated with the relation target item and seventh data B in which the search target item associated with the upper item is associated with the relation item, and the database update program causes the computer to execute an adding step in which, when the search target item not associated with any of the upper items and the relation item associated with this search target item are input, the record of this relation item and this search target item is added to the seventh data A, and when the search target item associated with the upper item and the relation item associated with this search target item are input, only the seventh data B of the seventh data is searched and thereby if a search target item which is associated with the above same upper item together with the search target item is found in the seventh data B regarding the same relation item as the relation item, the record of the relation item and the search target item is deleted from the seventh data B and a record in which the above same upper item is associated with the relation item is added to the sixth data, and if the relation item which is associated with the above same upper item together with the relation item is not found in the seventh data B, the input record is added to the seventh data B.

According to the database update program of this aspect, in order to decide whether the above update process is necessary, it is sufficient to search only the seventh data B which is a part of the seventh data without searching the whole of the seventh data by collecting the records that do not need to be searched into the seventh data A. Therefore, since the number of records to be searched is smaller than in the conventional database in which the whole of the seventh data needs to be searched, the search time is shortened and the time required for the update process can be shortened.

The above-mentioned program can be distributed or obtained in the state of being recorded on a recording medium such as a CD-ROM. Alternatively, it is available to distribute or receive the above-mentioned program in a state of signal which is carried and transmitted by a predetermined transmission device via a transmission medium such as a public telephone line, a dedicated line, or another communication network. At the time of this distribution, at least a part of the computer program may be transmitted in the transmission medium. That is, all the data comprising the computer program need not be present on the transmission medium at one time. The signal carrying the program described above is a computer data signal embodied on a predetermined carrier wave including the computer program. In addition, the transmission method of transmitting the computer program from the predetermined transmission apparatus includes the case of continuously transmitting data comprising the program and the case of intermittently transmitting the data.

Effects of the Invention

According to the present invention, search processing can be sped up.

BRIEF DESCRIPTION OF DRAWINGS

FIG. 3 is an example of the table summarizing a relationship between customer identification numbers 1, 2, 3, 4, 5, . . . , and goods names a, b, c, d of goods purchased by customers corresponding thereto in the past, which are managed by a database used by the said information search apparatus.

FIG. 4 is an example of a table summarizing a relationship between goods names and upper items, which are managed in a database used by the said information search apparatus.

FIG. 5 is an example of a table summarizing a relationship between customer identification numbers 1, 2, 3, 4, 5, . . . , and goods names a, b, c, d or upper items W, X, Y, Z, which are managed by a database used by the said information search apparatus.

FIG. 6 is an explanatory diagram showing a data structure of a second data table of a database used by the said information search apparatus.

FIG. 7 is an explanatory diagram showing a data structure of a third data table of a database used by the said information search apparatus.

FIG. 12 is an explanatory diagram showing a data structure of a fourth data table of a database used by an information search apparatus in a modified example.

FIG. 13 is an explanatory diagram showing a data structure of a fifth data table of a database used by the said information search apparatus.

FIG. 14 is an explanatory diagram showing a data structure of a first data table of a database used by the said information search apparatus.

FIG. 15 is an explanatory diagram showing a data structure of a second data table of a database used by the said information search apparatus.

FIG. 16 is an explanatory diagram showing a data structure of a data table in which a data table to be searched and a hierarchy are associated with each other.

FIG. 17 is an example of a table summarizing a relationship between customer identification numbers and goods names of goods purchased by the customers corresponding to the numbers in the past, in the effect confirmation test.

FIG. 18 is an explanatory diagram of an eighth data table in which the goods names a, b are associated with an upper item W, in the effect confirmation test.

FIG. 19 is an explanatory diagram showing a data table summarizing a relationship between the customer identification numbers 1 to 60000 and the goods names a, b or the upper item W, in the effect confirmation test.

FIG. 20 is an explanatory diagram showing a data table in which the upper item W is associated with customer identification numbers 20001 to 40000, among the customer identification numbers 1 to 60000, commonly related to two goods names a, b associated with the upper item W, in the effect confirmation test.

FIG. 21 is an explanatory diagram showing a data table in which the goods names a, b are associated with customer identification numbers 1 to 20000, 40001 to 60000, among the customer identification numbers 1 to 60000, related to the goods names a, b not associated with the upper item W, in the effect confirmation test.

FIG. 23A is an explanatory diagram showing a data structure of a third data table A which is one of two divisions of the third data table of the Embodiment 1, in an Embodiment 3.

FIG. 23B is an explanatory diagram showing a data structure of a third data table B which is the other of the two divisions of the said third data table, in the Embodiment 3.

FIG. 25 is an explanatory diagram of a first data table in which goods names a, b, c and an upper item Z are associated with each other, in an effect confirmation test of the Embodiment 3.

FIG. 26 is an explanatory diagram showing a second data table in which the upper item Z is associated with customer identification numbers 1 to 500, among the customer identification numbers 1 to 1000, commonly related to three goods names a, b, c associated with the upper item Z, in the said effect confirmation test.

FIG. 27 is an explanatory diagram showing a third data table A in which the goods name d is associated with customer identification numbers 1 to 1000, among the customer identification numbers 1 to 1000, related to the goods name d not associated with any of the upper items, in the effect confirmation test.

FIG. 28 is an explanatory diagram showing a third data table B in which, among the customer identification numbers 1 to 1000, the customer identification numbers 501 to 800 and 601 to 900 related to only a part of goods names a, b, c associated with the same upper item Z and the goods names b, c corresponding to the customer identification numbers are associated with each other, in the effect confirmation test.

FIG. 29 is an explanatory diagram showing one data table (a third data table), for comparison, in which the third data table A shown in FIG. 27 and the third data table B shown in FIG. 28 are combined.

FIG. 30 is an explanatory diagram showing a state of the second data table after the effect confirmation test.

FIG. 31 is an explanatory diagram showing a state of the third data table B after the effect confirmation test.

FIG. 32 is an explanatory diagram showing a state of the third data table after the effect confirmation test.

FIG. 33 is an example of a table summarizing a relationship between customer identification numbers and goods names of goods purchased by the customer corresponding to the numbers in the past, in an embodiment 4.

Figure 34:
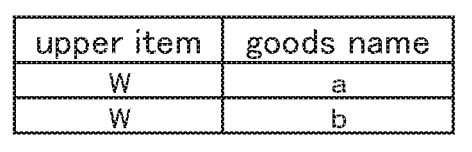

FIG. 34 is an explanatory diagram of an eighth data table in which the goods names a, b and the upper item W are associated with each other in the embodiment 4.

FIG. 35 is an explanatory diagram showing a data table summarizing a relationship between the customer identification numbers 1 to 70000 and the goods names a, b or the upper item W in the embodiment 4.

FIG. 36 is an explanatory diagram showing a data table in which the upper item W is associated with customer identification numbers 20001 to 40000, among the customer identification numbers 1 to 70000, commonly related to two goods names a, b associated with the upper item W, in the embodiment 4.

FIG. 37A is an explanatory diagram showing a data structure of a seventh data table A which is one of two divisions of the seventh data table in which the goods names a, b, c are associated with the customer identification numbers 1 to 20000, 40001 to 70000, among the customer identification numbers 1 to 70000, related to the goods names a, b, c not associated with the upper item W, in the embodiment 4.

FIG. 37B is an explanatory diagram showing a data structure of a seventh data table B which is the other of the two divisions of the said seventh data table.

DESCRIPTION OF EMBODIMENTS

Embodiment 1

Hereinafter, an embodiment of the present invention (hereinafter, this embodiment is referred to as "Embodiment 1") will be described with reference to the attached drawings.

The Embodiment 1 is an example of a search processing in which a computer searches, by using a database for managing goods purchase histories of customers in a store such as a supermarket or a department store, for an identification number (a search target item), associated with the goods name specified from among a plurality of goods names (relation items), of a customer (a customer who has purchased a goods of this goods name), from among a plurality of customer identification numbers. If a database is used to search for a search target item associated with a specified relation item from among a plurality of relation items by using a computer from among a plurality of search target items, embodiments of the present invention may be anything.

Also, in the following description, although an example of a relational database is described, the present invention is also applicable to other databases such as NoSQL database. In the NoSQL database, data tables described below correspond to buckets and collections.

Figure 1:
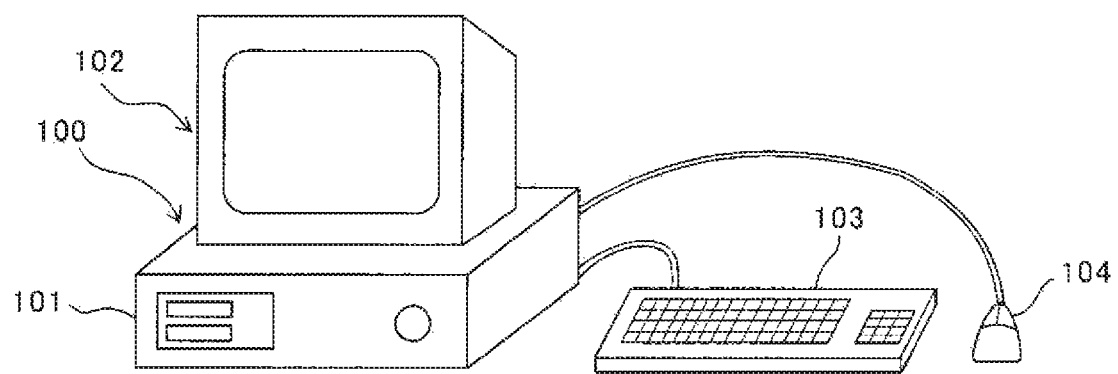
FIG. 1 is an external view schematically showing an information search apparatus according to an Embodiment 1.

FIG. 1 is an external view schematically showing an information search apparatus 100 in the Embodiment 1.

Figure 2:
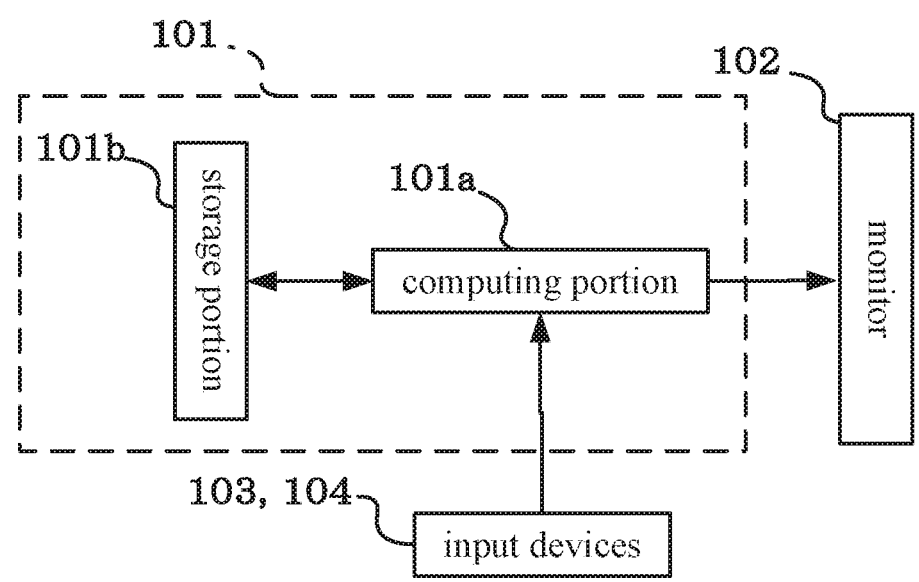
FIG. 2 is a block diagram showing a configuration of the information search apparatus.

FIG. 2 is a block diagram showing a configuration of the information search apparatus 100 in the Embodiment 1.

The information search apparatus 100 in the Embodiment 1 is obtained by installing predetermined database software (a search program, a database update program) in a general-purpose personal computer or server apparatus (hereinafter referred to as "computer device"). The information search apparatus 100 is not limited to such a general-purpose computer device, and may be an apparatus dedicated to information search.

The information search apparatus 100 according to the Embodiment 1 mainly includes an apparatus main body 101, a monitor 102 as a display portion that functions as display means, and input device as an operation reception portion that functions as operation reception means such as a keyboard 103 and a pointing device 104. The apparatus main body 101 mainly includes a computing portion 101a comprising a CPU (a central processing unit) etc. and a storage portion 101b comprising a storage device such as a ROM (a read only memory), a RAM (a random access memory) or a HDD (a hard disk drive), and it also has general functions with which a general-purpose computer device is equipped, such as a communication portion which is comprised of a communication interface etc.

The storage portion 101b of the apparatus main body 101 stores various computer programs including database software for causing the function of the information search apparatus 100 to be exhibited. Also, the storage portion 101b is a data storage portion that functions as data storage means, and stores a database having a data structure to be described later. The computing portion 101a of the apparatus main body 101 realizes various functions necessary for the operation as the information search apparatus 100 of the Embodiment 1 by causing the CPU to execute various computer programs stored in the storage portion 101b.

In particular, the computing portion 101a according to the Embodiment 1 performs, by causing the CPU to execute the search program included in the database software, a search processing to search for the customer identification number (the search target item) associated with the specified goods name (the relation item) by using the database stored in the storage portion 101b. In addition, the computing portion 101a according to the Embodiment 1 performs, by causing the CPU to execute the database update program included in the database software, a processing for updating by registering a record including the customer identification number (the search target item) additionally input and the goods name (the relation item) related thereto into the database. Further, the computing portion 101a according to the Embodiment 1 performs, by causing the CPU to execute the database update program included in the database software, a processing for creating (manufacturing) a new database by updating the database by associating the same upper item with the two or more goods names (the relation items) to be satisfied a predetermined upper item creation condition on the base of the customer identification number (the search target item) additionally input and the goods name (the relation item) related thereto.

FIG. 3 an example of a table summarizing a relationship between customer identification numbers 1, 2, 3, 4, 5, . . . (the search target items) and goods names a, b, c, d (the relation items) of goods purchased by customers corresponding thereto in the past, which are managed by the database used by the information search apparatus 100 according to the Embodiment 1. According to this table, it is managed that the customer of the customer identification number 1 purchases the goods of the goods names a, b, c, the customer of the customer identification number 2 purchases the goods of the goods names a, c, the customer of the customer identification number 3 purchases the goods of the goods name b, the customer of the customer identification number 4 purchases the goods of the goods names a, c, the customer of the customer identification number 5 purchases the goods of the goods name a, and the customer of customer identification number 10 purchases the goods of the goods name d.

In a conventional general database, a data table such as the table shown in FIG. 3 is created, and search processing is performed on this data table. In this case, the number of records is nine only for the goods purchased by the customers of the customer identification numbers 1 to 5, for example, when searching for the identification number of the customer who purchased the goods of the goods name a, 9 records need to be searched.

FIG. 4 is an example of a table summarizing a relationship between the goods names (the relation items) and the upper items, which are managed in the database used by the information search apparatus 100 according to the Embodiment 1.

In the Embodiment 1, predetermined two or more goods names (the relation items) are grouped into an upper item. In the example of the table shown in FIG. 4, the goods name a and the goods name b are grouped into the upper item W, the goods name a and the goods name c are grouped into the upper item X, and the goods name b and the goods name c are grouped into the upper item Y, and the goods name a, the goods name b and the goods name c are grouped into upper items Z.

FIG. 5 is an example of a table summarizing a relationship between customer identification numbers 1, 2, 3, 4, 5, . . . , and goods names a, b, c, d or upper items W, X, Y, Z, which are managed by a database used by the said information search apparatus.

Assuming that a data table such as the table shown in FIG. 5 is created and search processing is performed on the data table, the number of records is five if viewed only by the number of goods purchased by customers of the customer identification numbers 1 to 5, and thus the number of records to be searched can be smaller than in a conventional general database using a data table such as the table shown in FIG. 3. As described above, if the number of records to be searched can be reduced, the search processing can be speeded up in either case where the customer identification number is searched by specifying one goods name (the relation items) or the search processing with an OR condition or an AND condition is performed by specifying two or more goods names (the relation items).

However, in the case of a search processing for the data table such as the table shown in FIG. 5, the number of records to be searched is the same in any case where the customer identification number (the search target item) is searched by specifying one goods name (the relation items), the customer identification number is searched with the AND condition by specifying two or more goods names and the customer identification number is searched with the OR condition by specifying two or more goods names.

In the Embodiment 1, by using a database having the following data structure, an expected value of the search processing speed is improved in the case where the customer identification number is searched for two or more goods names (the relation items) under the AND condition.

FIG. 6 is an explanatory diagram showing a data structure of a second data table as second data of a database used by the information search apparatus 100 in the Embodiment 1.

In the second data table shown in FIG. 6, the same upper items W, X, Y, Z is associated with the customer identification numbers 1, 2, 4, 6, 7, . . . , among the plurality of customer identification numbers 1, 2, 3, 4, 5, . . . (search target items), related to all of the goods names a, b, c (the relation items) associated with the upper items W, X, Y, Z. The second data table is stored in the storage portion 101b, and the computing portion 101a can execute a search program to search from the second data table.

FIG. 7 is an explanatory diagram showing a data structure of a third data table as third data of the database used by the information search apparatus 100 in the Embodiment 1.

In the third data table shown in FIG. 7, the goods name d is associated with the customer identification numbers 3, 5, 8, . . . related to only part of the goods names a, b, c (the relation items) associated with the same upper items W, X, Y, Z, and the customer identification number 10 not related to any of the names a, b, c (the relation items) associated with the same upper items W, X, Y, Z. The third data table is stored in the storage portion 101b, and the computing portion 101a can execute a search program to search from the third data table.

Figure 8:
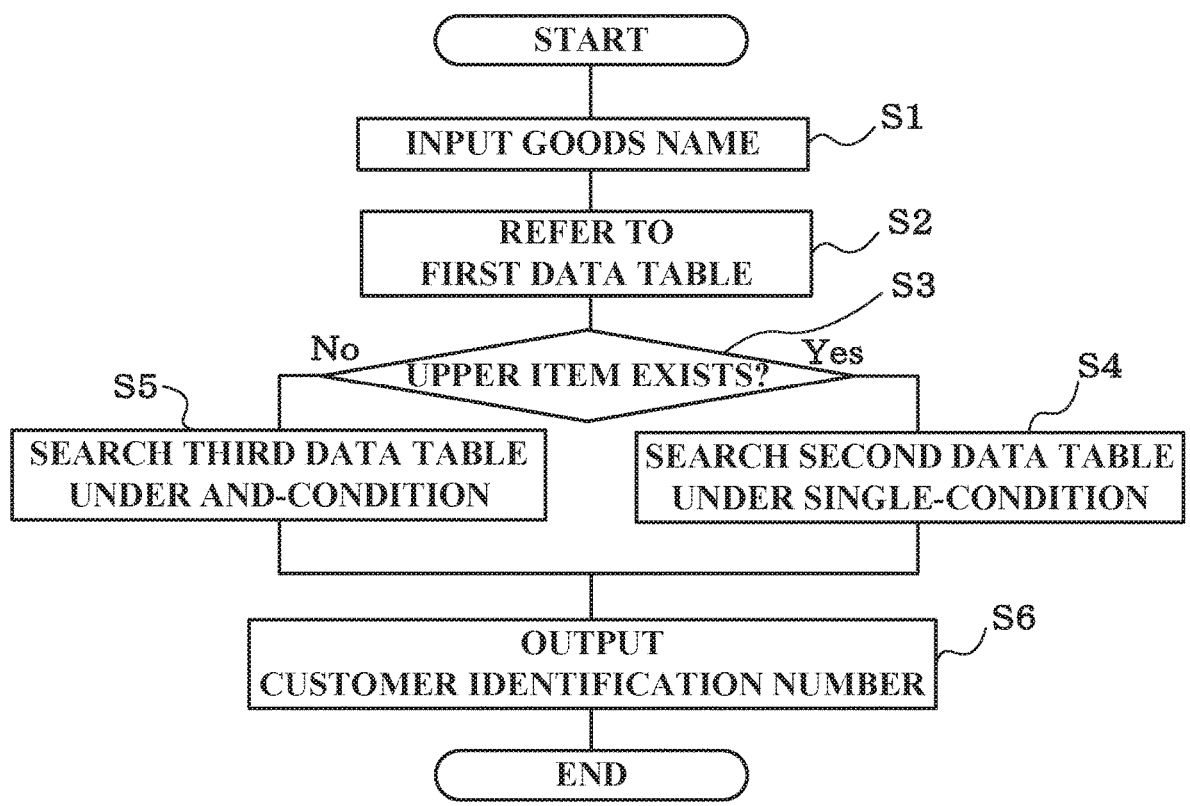
FIG. 8 is a flowchart showing a flow of search processing under an AND condition in the Embodiment 1.

FIG. 8 is a flowchart showing the flow of search processing under the AND condition in the Embodiment 1.

For example, consider a case where, under an AND condition of the goods name a and the goods name b, a customer identification number of which a customer purchased both goods thereof is searched. When the goods name a and the goods name b to be searched under the AND condition are input by an user, for example, operating the input devices 103, 104 (S1), the computing portion 101a executes the search program and, first, refers to the first data table, as the first data, configured an association such as the table shown in FIG. 4 (S2), decides whether there is a upper item in which two goods names of the goods name a and the goods name b are grouped (S3). The first data table is stored in the storage portion 101b.

Here, since there is the upper item W in which two goods names of the goods name a and the goods name b are grouped (Yes in S3), the computing portion 101a searches the customer identification number associated with the upper item W from the entire second data table shown in FIG. 6 (S4). Then, the customer identification number 6 related to the search result is output (S6). This output may be to display the customer identification number itself related to the search result on the monitor 102 or to output other information associated with the search results, for example, such as to display on the monitor 102 a various customer information (sex, age group, etc.) associated with the customer identification number 6 by reading out from other data table or an information as a result of various analysis and processing for these readout results. Further, the output method is not limited to the method of displaying on the monitor 102, and may be other output method such as a method of transmitting from the communication portion to an external device through a network or a method of recording on a storage device in a computer.

On the other hand, if there is no upper item obtained by grouping two goods names of goods name a and goods name b (No in S3), the computing portion 101a searches the customer identification number associated with the two goods names a, b under the AND condition from the entire third data table shown in FIG. 7 (S5), and the search result is output (S6).

According to the Embodiment 1, when all of the two specified goods names a, b (the relation items) match the two goods names a, b associated with the upper item W, the search processing is completed only by searching the customer identification number (the search target item) associated with the upper item W in the second data table shown in FIG. 6 (without performing the search processing in the third data table). The second data table contains only the customer identification numbers related to all of the two or more goods names associated with the upper items W, X, Y, Z. Therefore, the number of records to be searched is smaller than in the conventional case where a search processing is performed on a data table such as the table shown in FIG. 3 as well as in the case where a search processing is performed on a data table such as the table shown in FIG. 5, thereby the search processing speed can be increased.

Also, when all of the two specified goods names (the relation items) do not match the two goods names a, b associated with the upper item W, the search processing is completed only by searching the customer identification number (the search target item) associated with the two goods names in the third data table shown in FIG. 7 (without performing the search processing in the second data table). The third data table does not contain records in which the goods name (the relation item) and the customer identification number (the search target item) having the relevancy included in the second data table are associated with each other, so the number of the records is small and the search processing speed can be increased.

As described above, since the search processing of the AND condition is speeded up in any case, it is possible to improve the expected value of the search processing speed when using the database having the data structure according to the Embodiment 1.

In particular, according to the Embodiment 1, if the upper items are appropriately associated with two or more goods names (the relation items) expected to have a high frequency specified by the AND condition at the time of the search, the frequency of execution of the search processing for the second data table can be increased. Since the search processing (S4) for the second data table is a search processing under a single condition, even if the number of records is the same, it is possible to perform a search faster than the search processing (S5) performed under the AND condition for the third data table. Therefore, the expected value of the search processing speed is further improved.

Further, in the Embodiment 1, the same applies to a search processing for searching the customer identification number related to one goods name (the relation item) under the single condition by using the database having the above-described data structure, the search processing speed is improved.

Figure 9:
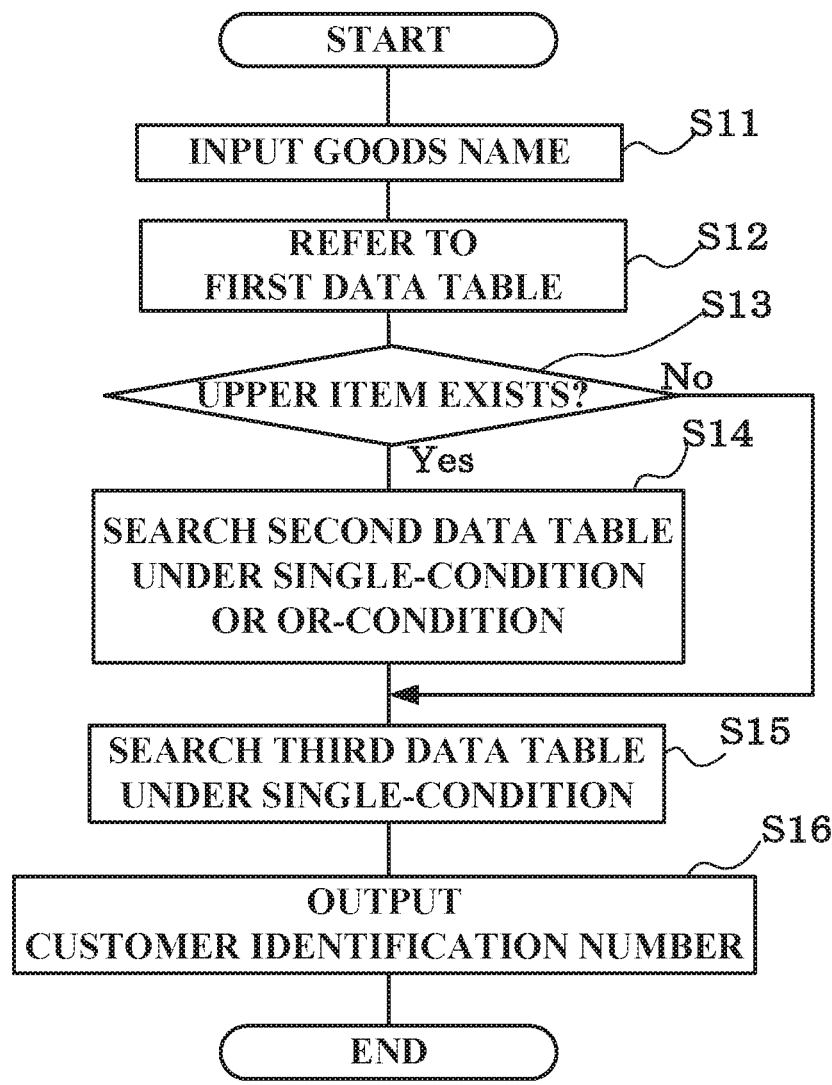
FIG. 9 is a flowchart showing a flow of search processing under a single condition in the Embodiment 1.

FIG. 9 is a flowchart showing a flow of search processing under a single condition in the Embodiment 1.

For example, consider a case where, under the single condition of the goods name a, a customer identification number of which a customer purchased the goods thereof is searched. When the goods name a is input by the user, for example, operating the input devices 103, 104 (S11), the computing portion 101a executes the search program and, first, refers to the first data table in the storage portion 101b shown in FIG. 4 (S12), and decides whether there is an upper item associated with the goods name a (S13).

Here, since there is the upper items W, X, Z associated with the goods name a (Yes in S13), the computing portion 101a searches the customer identification number associated with these upper items W, X, Z from the entire second data table shown in FIG. 6 under the OR condition (S14). However, when there is only one upper item associated with the goods name a, the computing portion 101a simply searches the customer identification number associated with the one upper item from the entire second data table under the single condition. Furthermore, the computing portion 101a also searches the customer identification number associated with the goods name a under the single condition in the third data table shown in FIG. 7 (S15). Then, the customer identification numbers 1, 2, 4, 5, 6 related to these search results are output (S16).

On the other hand, if there is no upper item associated with the goods name a (No in S13), the computing portion 101a searches the customer identification number associated with the goods names a under the single condition from the entire third data table shown in FIG. 7 (S15), and the customer identification number related to the search result is output (S16).

According to the Embodiment 1, when there is no upper item associated with one specified goods name a (the relation item), the search processing is completed only by searching the customer identification number (the search target item) associated with one goods name a under the single condition in the third data table shown in FIG. 7 (without performing the search processing in the second data table). As described above, the third data table does not contain records in which the goods name (the relation item) and the customer identification number (the search target item) having the relevancy included in the second data table are associated with each other, so the number of records to be searched is smaller than in the conventional case where a search processing is performed on a data table such as the table shown in FIG. 3 as well as in the case where a search processing is performed on a data table such as the table shown in FIG. 5, thereby the search processing speed can be increased.

In addition, when there is the upper item associated with one specified goods name a (the relation item), the search processing executes for both the second data table shown in FIG. 6 and the third data table shown in FIG. 7. Since the total number of records at this time is small compared to the conventional case where the search processing is performed for the data table such as the table shown in FIG. 3, the search processing speed can be increased, but the number of records is the same as compared to the case where a search processing is performed for a data table such as the table shown in FIG. 5, and it is impossible to increase the search processing speed by reducing the number of records.

However, while the number of items of the OR condition in the case where the search processing is performed for the data table such as the table shown in FIG. 5 is a total of four of the upper items W, X, Z and the goods name a, the number of items of the OR condition in the case of the Embodiment 1 is three of the upper items W, X, Z at the time of search processing for the second data table shown in FIG. 6. Therefore, in the search processing under the OR condition required in the Embodiment 1 (the search processing for the second data table shown in FIG. 6), the number of items in the OR condition is smaller and the number of records searched under the OR condition is also smaller, compared to the search processing for the data table such as the table shown in FIG. 5 under the OR condition. The smaller the number of items in the OR condition, the smaller the increase in search processing time (overhead) under the OR condition, and the smaller the number of records searched under the OR condition, the smaller the overhead under the OR condition. Therefore, according to the Embodiment 1, the search processing speed can be increased as compared with the case where the search processing is performed for the data table such as the table shown in FIG. 5.

Furthermore, in the Embodiment 1, by using the database having the above-described data structure, the search processing speed is similarly improved when the search processing for searching the customer identification number related to two or more goods names (the relation items) under the OR condition is performed.

Figure 10:
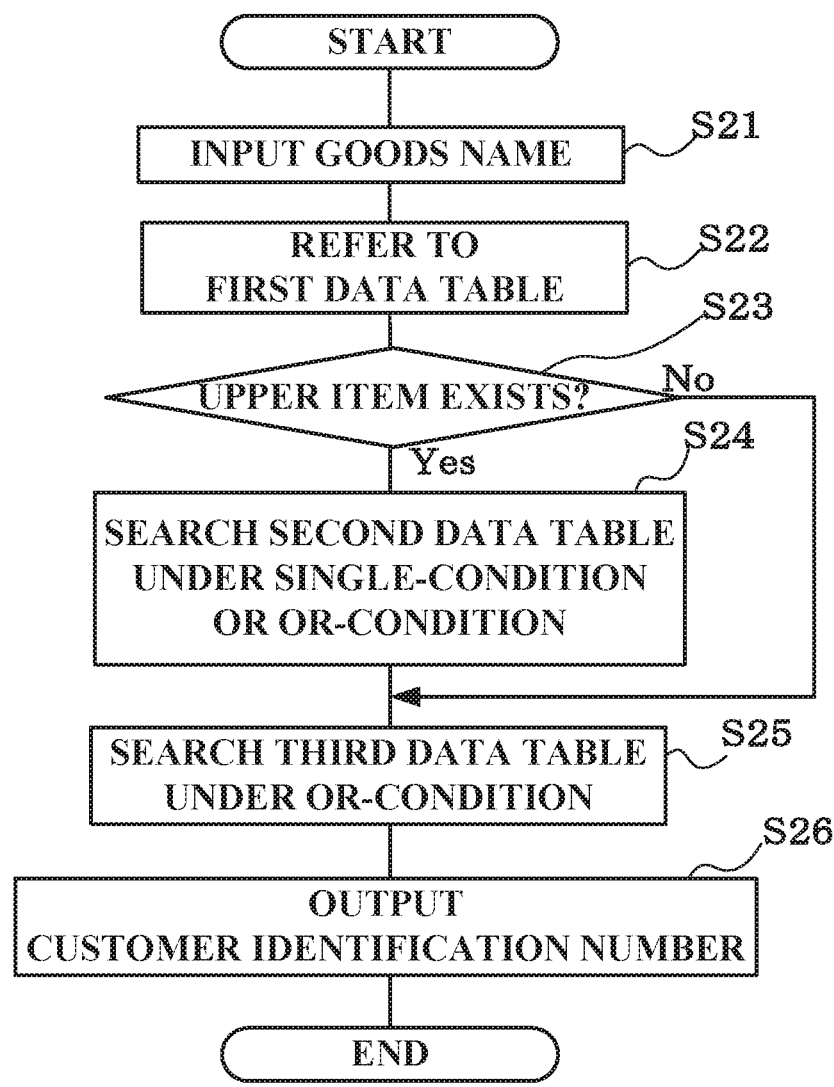
FIG. 10 is a flowchart showing a flow of search processing under the OR condition in the Embodiment 1.

FIG. 10 is a flowchart showing a flow of the search processing under the OR condition in the Embodiment 1.

For example, consider a case where, under the OR condition of the goods name a and the goods name b, a customer identification number of which a customer purchased any goods thereof is searched. When the goods names a and the goods name b to be searched under the OR condition are input by the user, for example, operating the input devices 103, 104 (S21), the computing portion 101a executes the search program and, first, refers to the first data table in the storage portion 101b shown in FIG. 4 (S22), and decides whether there is an upper item associated with the goods name a or the goods name b (S23).

Here, since there is the upper items W, X, Z associated with the goods name a and the upper items W, Y, Z associated with the goods name b (Yes in S23), the computing portion 101a searches the customer identification number associated with these upper items W, X, Y, Z from the entire second data table shown in FIG. 6 under the OR condition (S24). However, when there is only one upper item associated with the goods name a or the goods name b, the computing portion 101a simply searches the customer identification number associated with the one upper item from the entire second data table under the single condition. Furthermore, the computing portion 101a also searches the customer identification number associated with the goods name a and the goods name b under the OR condition in the third data table shown in FIG. 7 (S25). Then, the customer identification numbers related to these search results are output (S26).

On the other hand, if there is no upper item associated with the goods name a or the goods name b (No in S23), the computing portion 101a searches the customer identification number associated with the goods names a and the goods names b under the OR condition from the entire third data table shown in FIG. 7 (S25), and the customer identification number related to the search result is output (S26).

According to the Embodiment 1, when there is no upper item associated with the two specified goods names a or b (the relation items), the search processing is completed only by searching the customer identification number (the search target item) associated with one goods name a and one goods name b under the OR condition (without performing the search processing for the second data table) in the third data table shown in FIG. 7. As described above, the third data table does not contain records in which the goods name (the relation item) and the customer identification number (the search target item) having the relevancy included in the second data table are associated with each other, so the number of records to be searched is smaller than in the conventional case where a search processing is performed on a data table such as the table shown in FIG. 3 as well as in the case where a search processing is performed on a data table such as the table shown in FIG. 5, thereby the search processing speed can be increased.

In addition, when there is the upper item associated with the two specified goods names a or b (the relation item), the search processing executes for both the second data table shown in FIG. 6 and the third data table shown in FIG. 7. Since the total number of records at this time is small compared to the conventional case where the search processing is performed for the data table such as the table shown in FIG. 3, the search processing speed can be increased, but the number of records is the same as compared to the case where a search processing is performed for a data table such as the table shown in FIG. 5, and it is impossible to increase the search processing speed by reducing the number of records.

However, while the number of items of the OR condition in the case where the search processing is performed for the data table such as the table shown in FIG. 5 is a total of six of the upper items W, X, Y, Z and the goods names a, b, the number of items of the OR condition in the case of the Embodiment 1 is four of the upper items W, X, Y, Z at the time of search processing for the second data table shown in FIG. 6 and two of the goods names a, b at the time of search processing for the third data table shown in FIG. 7. In the search processing under the OR condition required in the Embodiment 1, the number of items under the OR condition in each search processing is smaller and the number of records searched under the OR condition in each search processing is also smaller, compared to the search processing for the data table such as the table shown in FIG. 5 under the OR condition. The smaller the number of items in the OR condition, the smaller the increase in search processing time (overhead) under the OR condition, and the smaller the number of records searched under the OR condition, the smaller the overhead under the OR condition, therefore, according to the Embodiment 1, the search processing speed can be increased as compared with the case where the search processing is performed for the data table such as the table shown in FIG. 5.

As described above, according to the Embodiment 1, it is possible to speed up the search processing speed under any conditions of the single condition, the AND condition and the OR condition, compared to the conventional case where the search processing is performed for the data table such as the table shown in FIG. 3 and the data table such as the table shown in FIG. 5.

In the Embodiment 1, as shown in FIG. 4, predetermined two or more goods names (the relation items) are grouped into the upper item, but the grouping condition (an upper item creating condition) can be set appropriately. For example, when there are a predetermined number or more of customer identification numbers (the search target items) related to all of two or more goods names (the relation items) (or when the predetermined number or more according to the progress of data accumulation), the two or more goods names (the relation items) may be grouped into the upper item. In this case, the number of records registered in the second data table shown in FIG. 6 is increased relative to the number of records registered in the third data table shown in FIG. 7, thereby it is possible to realize faster search processing. Also, for example, from a history of specified goods names (the relation items) in the past search processing etc., the AND condition of two or more goods names (the relation items) specified in the future is anticipated (estimated), thereby two or more goods names (the relation items) estimated to be a high frequency of searching under the AND condition may be grouped into the upper item. In this case, the frequency of the search processing using only the second data table shown in FIG. 6 (search processing not using the third data table shown in FIG. 7) is increased, so that it is able to increase the search processing speed under the AND condition.

Further, the Embodiment 1 is an example of speeding up the search processing speed when two or more specified goods names (the relation items) are searched under the AND condition, but it is also possible to speed up the search processing speed when two or more specified goods names (the relation item) are searched under the OR condition. In this case, the second data table may be constructed to include, for example, the search target items related to at least one of two or more goods names (the relation items) associated with the same upper item in the first data table.

Next, an update method (manufacturing method) of the database having the data structure in the Embodiment 1 will be described.

As in the Embodiment 1, in the database for managing the goods purchase history of customers in stores such as supermarkets and department stores, new data is added daily, and old data is deleted daily as needed. In the Embodiment 1, the customer identification number and the goods name purchased by the customers are input by manual input of the user using the input devices 103, 104, so that the second data table shown in FIG. 6 or the third data table shown in FIG. 7 is updated. The new data input method is not limited to such manual input, and it may be, for example, a method of inputting by being received, by the communication portion of the information search apparatus 100, data of which the customer identification number and the goods name purchased by the customer is transmitted from the cash register system of the store. The input timing may, for example, be input each time one new data is generated, or may be periodically input a plurality of new data.

Figure 11:
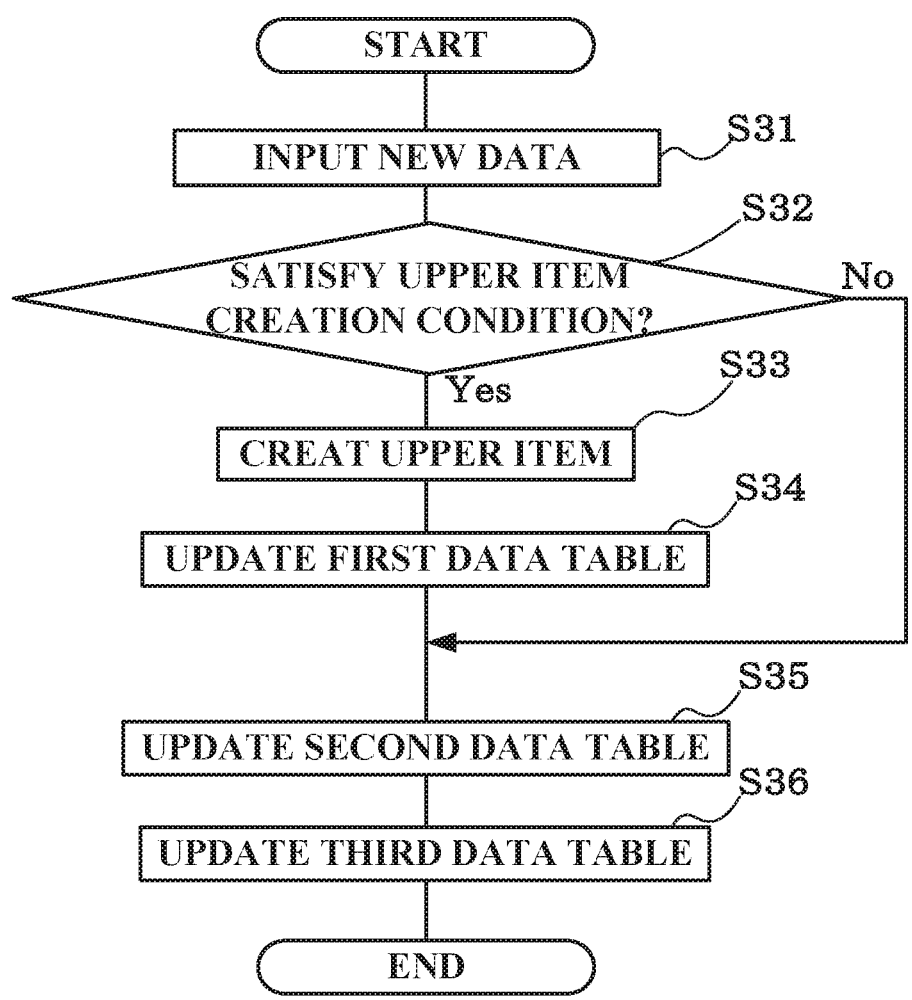
FIG. 11 is a flowchart showing a flow of database update process in the Embodiment 1.

FIG. 11 is a flowchart showing the flow of the database update process in the Embodiment 1.

When new data is input to the information search apparatus 100 functioning as a database manufacturing apparatus (S31), the computing portion 101a becomes an adding portion functioning as adding means by executing a database manufacturing program, and an adding step of adding new data to the database in the storage portion 101b is performed. Then, it is decided whether the upper item creation condition for grouping two or more predetermined goods names (the relation items) into upper item is satisfied (S32). This upper item creation condition can be appropriately set as described above. At this time, when the upper item creation condition is not satisfied by the new data input (No in S32), the computing portion 101a becomes an updating portion functioning as updating means, and an update process (an update step) in which a record of the customer identification number which is to be newly associated with the existing upper item by the new data input is added into the second data table shown in FIG. 6 is performed (S35), and an update process (an update step) in which the record corresponding to the record added into the second data table is deleted from the third data table shown in FIG. 7 is performed (S36). Also, with regard to the record of the customer identification number which is not newly associated with the existing upper item by the new data input, an update process (an update step) is performed to add to the third data table shown in FIG. 7 (S36).

On the other hand, when the upper item creation condition is satisfied by the new data input (Yes in S32), a new upper item corresponding to this upper item creation condition is created (S33). For example, in the case where the upper item creation condition is a condition that the number of customer identification numbers (the search target items) related to all of two or more goods names (the relation items) is a predetermined number or more, if the number of customer identification numbers (the search target items) reaches the predetermined number or more by new data input, the new upper item is created and the two or more goods names (the relation items) are grouped by the new upper item. Then, an update process (update step) is performed to add a record in which the new upper item is associated with these two or more goods names (the relation items) into the first database shown in FIG. 4 (S34).

Subsequently, an update process is performed to newly add the record of the customer identification number newly associated with the existing upper item or the new upper item by the new data input into the second data table shown in FIG. 6 (S35), and an update process is performed to delete the record corresponding to the record added into the second data table from the third data table shown in FIG. 7 (S36). Further, with respect to the record of the customer identification number which is not newly associated with the existing upper item or the new upper item by the new data input, an update process of adding into the third data table shown in FIG. 7 is performed (S36).

By executing the database update process as described above, the search processing can be performed by using the database in which the latest data appropriately grouped into the upper items is managed by each data table described above. Moreover, in the Embodiment 1, when the upper item creation condition is satisfied by the new data input, a new upper item is created and the database including the new upper item is updated. As a result, the latest data is grouped into appropriate upper items, and the search processing using the database managed by each data table described above is realized.

Modified Example

Next, a modified example of the data structure of the database in the Embodiment 1 described above will be described.

Figure 12:
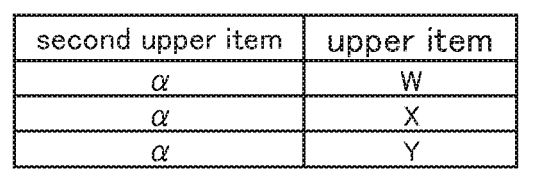

FIG. 12 is an explanatory diagram showing a data structure of a fourth data table as fourth data of a database used by the information search apparatus 100 in the present modified example.

In this modified example, the fourth data table in which two or more upper items W, X, Y are grouped by the same second upper item α and these upper items W, X, Y are associated with the second upper item α is created, and stored in the storage portion 101b. The goods names associated with the second upper item α through the upper items W, X, Y are a, b, c, and are the same as the upper item Z in the Embodiment 1 described above. In the present modified example, the upper item Z is not created.

FIG. 13 is an explanatory diagram showing a data structure of a fifth data table as fifth data of the database used by the information search apparatus 100 in the present modified example.

In the fifth data table shown in FIG. 13, the customer identification numbers 1, 9 related to the goods names a, b, c (the relation items) associated with the second upper item α via the upper items W, X, Y is associated with the second upper item α. The fifth data table is stored in the storage portion 101b, and the computing portion 101a can perform a search from the fifth data table by executing a search program.

Figure 14:
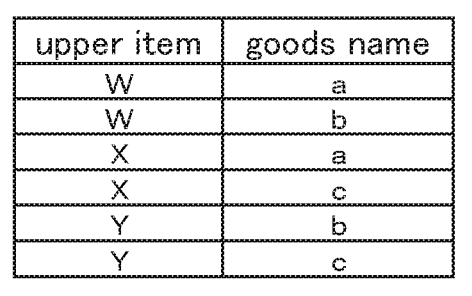

FIG. 14 is an explanatory diagram showing a data structure of a first data table of a database used by the information search apparatus 100 in the present modified example.

In the first data table shown in FIG. 14, the goods names a, b, c (the relation items) associated with the upper items W, X, Y are associated with the upper items W, X, Y. The first data table of this modified example corresponds to the first data table shown in FIG. 4 of the Embodiment 1 described above except that the record corresponding to the upper item Z is excluded.

FIG. 15 is an explanatory diagram showing a data structure of a second data table of a database used by the information search apparatus 100 in the present modified example.

In the second data table shown in FIG. 15, the customer identification numbers 2, 4, 6, 7, . . . related to the goods names a, b, c (the relation items) associated with the upper items W, X, Y are associated with the upper item W, X, Y. The second data table of this modified example corresponds to the second data table shown in FIG. 6 of the Embodiment 1 described above except that the record corresponding to the upper item Z is excluded.

The basic flow of the search processing in this modified example is the same as that of the Embodiment 1 described above. That is, when the goods name to be searched is input, the computing portion 101a executes the search program, first refers to the first data table shown in FIG. 14, and decides whether there is the upper item corresponding to the specified goods name. However, if there is the upper item corresponding to the specified goods name, the fourth data table shown in FIG. 12 is further referred to, and it is decided whether there is the second upper item for the upper item corresponding to the specified goods name. Then, if it is decided that there is the second upper item as a result of this decision, the computing portion 101a searches the customer identification number associated with the second upper item from the entire fifth data table shown in FIG. 13.

In the database of the present modified example, the data table is managed by subdividing (hierarchizing) further than in the Embodiment 1 described above, whereby the number of records in each data table can be reduced and the speed of the search processing can be increased. Moreover, according to this modified example, it is possible to further reduce the number of items of the OR condition at the time of the search than in the Embodiment 1 described above, and speed up the search processing. Furthermore, according to this modified example, in the search processing under the AND condition, when all specified goods names are associated with the second upper item, the search processing can be completed only by searching the customer identification number (the search target item) associated with the second upper item under the single condition in the fifth data table shown in FIG. 13, and particularly high-speed search processing is realized.

Note that, when the grouping hierarchy is constructed by a plurality of steps as in the present modified example, a data table as shown in FIG. 16 may be used in the search processing. The data table shown in FIG. 16 associates the data table to be searched with the hierarchy, and indicates that the data table is such that the larger the numeral of the hierarchy, the higher upper items are associated with the search target items.

Using a data table as shown in FIG. 16 is particularly advantageous particularly when a database is updated by adding new data. Specifically, when a new upper item or a new second upper item is increased according to the upper item creation condition by the addition of new data, the number of records in a second data table in which the upper item and the search target item are associated with each other and the number of records in the fifth data table in which the second upper item and the search target item are associated with each other are increased. As a result, the number of records at the time of the search processing for these data tables increases, and it takes time for the search processing. In such a case, it is effective that two or more second upper items are further grouped by a third upper item, then a new data table (sixth data) in which these second upper items and the third upper item are associated with each other is created, and a new data table (sixth data) in which the third upper item is associated with the search target item related to the relation item associated with the third upper item via the second upper item.

When adding a new data table in this way, it is usually necessary to change the contents of the search program in response to this, but by using the data table as shown in FIG. 16, the new data table can be added without changing the contents of the program. That is, the search program refers to the data table as shown in FIG. 16 so as to identify the data structure of the database, thereby updating the data table shown in FIG. 16 when a new data table is added, so that the search processing can be performed using the newly added data table without changing the contents of the search program.

Next, an effect confirmation test in Embodiment 1 will be described.

FIG. 17 is an example of a table summarizing a relationship between customer identification numbers (the search target items) and goods names (the relation items) of goods purchased by customers corresponding to the numbers in the past, in the present effect confirmation test.

This effect confirmation test was performed in an example in which the goods names (the relation items) are two of goods name a and goods name b, the customer identification numbers (the search target items) are 60,000 of 1 to 60000, and the goods name a is associated with 40,000 of the customer identification number 1 to 40000, and the goods name b is associated with 40,000 of the customer identification number 20001 to 60000. Further, in the present effect confirmation test, two goods names a, b (the relation items) were grouped into the upper item W.

Figure 18:
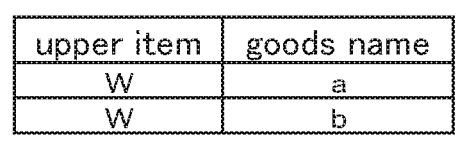

FIG. 18 shows a data table in which the goods names a, b (the relation items) are associated with upper items W in the present effect confirmation test, and corresponds to the first data table shown in FIG. 4 in the Embodiment 1 described above.

FIG. 19 shows a data table summarizing a relationship between the customer identification numbers 1 to 60000 (the search target items) and the goods names a, b (the relation items) or the upper items W in the present effect confirmation test, and corresponds to the data table of the table shown in FIG. 5.

FIG. 20 shows a data in which the upper item W is associated with the customer identification numbers 20001 to 40000, among the customer identification numbers 1 to 60000 (the search target items), related to all of the two goods names a, b (the relation items) associated with the upper item W, and corresponds to the second data table shown in FIG. 6 in the Embodiment 1 described above.

FIG. 21 shows a data in which, among the customer identification numbers 1 to 60000 (the search target items), the customer identification numbers 1 to 20000 and 40001 to 60000 related to only part of goods names a, b (the relation items) associated with the same upper item W are associated with the goods name, and customer identification numbers not related to any of the goods names a, b (the relation items) associated with the same upper item W are associated with a goods name (the relation item) other than a, b (however, such data does not exist in this example), and corresponds to the third data table shown in FIG. 7 in the Embodiment 1 described above.

In the present effect confirmation test, a test was performed to compare Case 1 in which search processing is performed on a data table such as the table shown in FIG. 17, Case 2 in which search processing is performed on a data table shown in FIG. 19 and Case 3 (Embodiment 1) in which search processing is performed on the two data tables shown in FIG. 20 and FIG. 21.

In the effect confirmation test, a test was performed by using a search condition (1) of the single condition in which a customer identification number related to the goods name a is searched and output the number of results, a search condition (2) of the OR condition in which a customer identification number related to the goods name a or the goods name b is searched and output the number of results, and a search condition (3) of the AND condition in which a customer identification number related to the goods name a and the goods name b is searched and output the number of results. Then, for each of the search conditions (1) to (3), the time when the test is continuously repeated 100 times was measured as the search time.

Other main conditions of this effect confirmation test are as follows.

Information search apparatus: Fujitsu SELSIUS W510
OS: Windows 10
DBMS: MySQL Server 5.1.40-community The results of the present effect confirmation test are as shown in Table 4 below.

TABLE 4

| | search condition (1) | search condition (2) | search condition (3) |
|---|---|---|---|
| Case 1 | 3.57 seconds | 4.06 seconds | 7.74 seconds |
| Case 2 | 3.03 seconds | 3.17 seconds | 2.67 seconds |
| Case 3 | 2.79 seconds | 2.99 seconds | 0.92 seconds |

In any of the search conditions (1) to (3), in Case 2 and Case 3, the search time is shorter than in Case 1. This is can be said that the effect mainly due to the reduction of the number of records to be searched, because the number in Case 1 is 80,000 for the number of records in the data table shown in FIG. 17, while the number in Case 2 is 60,000 for the number of records in the data table shown in FIG. 19 and the number in Case 3 is 60,000 which is the total number of records in the two data tables shown in FIG. 20 and FIG. 21.

Further, in the case of the search condition (1), in Case 2, referring to the eighth data table shown in FIG. 18, the search processing is performed under the OR condition of the goods name a and the upper item W in the data table shown in FIG. 19. On the other hand, in Case 3, referring to the eighth data table shown in FIG. 18, the search processing is performed under the single condition of the upper item W in the second data table shown in FIG. 20 and the search processing is performed under the single condition of the goods name a in the third data table shown in FIG. 21.

As described above, in the case of the search condition (1), in Case 2 and Case 3, although the number of records to be searched is both 60,000, in Case 2, as a result of performing the search processing under the OR condition, an overhead is occurred by the OR condition, while, in Case 3, the overhead of the OR condition is not occurred. This is considered to be one of the reasons why the search time can be shortened in Case 3 than in Case 2.

Further, in the case of the search condition (2), in Case 2, referring to the eighth data table shown in FIG. 18, the search processing is performed under the OR condition of the goods name a, the goods name b and the upper item W in the data table shown in FIG. 19. On the other hand, in Case 3, referring to the eighth data table shown in FIG. 18, the search processing is performed under the single condition of the upper item W in the second data table shown in FIG. 20, and the search processing is performed under the OR condition of the goods name a and the goods name b in the third data table shown in FIG. 21.

As described above, in the case of the search condition (2), in Case 2 and Case 3, the number of records to be searched is both 60,000 and each search processing is performed under the OR condition, so the overhead of the OR condition is occurred. However, in Case 3, the number of records in the third data table in which the search processing is performed under the OR condition is 40,000 and is smaller than the number of records (60,000) of the data table in which the search processing is performed under the OR condition in Case 2. Furthermore, in Case 3, the number of items of the OR condition is two items of goods name a and goods name b, and is smaller than in Case 2 in which the number of items of the OR condition is three items of goods name a, goods name b and the upper item W. For these reasons, it is considered that Case 3 can reduce the search time more than Case 2.

Further, in the case of the search condition (3), in Case 2, referring to the eighth data table shown in FIG. 18, the search processing is performed under the single condition of the upper item W in the data table shown in FIG. 19. On the other hand, in Case 3, referring to the eighth data table shown in FIG. 18, the search processing is performed under the single condition of the upper item W in the second data table shown in FIG. 20, and the search processing for the third data table shown in FIG. 21 is not performed.

Thus, in the case of the search condition (3), in Case 2, the number of records searched in the single condition is 60,000, while in Case 3, the number of records searched in the single condition is 20,000. This is considered to be one of the reasons why the search time can be significantly shortened in Case 3 than in Case 2.

According to Case 2 described above, the number of records to be searched is always as small as ¾ (=60000/80000) compared to Case 1. Therefore, Case 2 theoretically has a search time of about ¾ that of Case 1.

On the other hand, in Case 3, since the number of records to be searched varies depending on the search condition, the shortening effect of the search time also varies depending on the search condition.

For example, there is a case where a search condition does not need to search the second data table shown in FIG. 20 with reference to the eighth data table shown in FIG. 18. In this case, only the third data table shown in FIG. 21 needs to be searched, and the number of records to be searched is 40,000 which is the number of records in the third data table shown in FIG. 21, so that the search time is theoretically ⅔ (=40000/60000) compared to Case 2.

On the other hand, for example, there is a case where a search condition does not need to search the third data table shown in FIG. 21 with reference to the eighth data table shown in FIG. 18. In this case, only the second data table shown in FIG. 20 needs to be searched, and the number of records to be searched is 20,000 which is the number of records in the second data table shown in FIG. 20, so that the search time is theoretically ⅓ (=20000/60000) compared to Case 2.

Also, for example, there is a case where it is necessary to search both the second data table shown in FIG. 20 and the third data table shown in FIG. 21 with reference to the eighth data table shown in FIG. 18. In this case, the number of records to be searched is 60,000 which is the same as in Case 2, and the search time is theoretically the same as in Case 2. However, since the overhead due to the OR condition at the time of search is smaller in Case 3 than in Case 2, it is confirmed by experiments that the search time in Case 3 is shorter than Case 2 even if the number of records is the same.

Embodiment 2

Next, another embodiment of the present invention (hereinafter, this embodiment is referred to as "Embodiment 2") will be described.

Similarly to the Embodiment 1, the Embodiment 2 also uses a database for managing goods purchase histories of customers in a store such as a supermarket or a department store, but is an example of a search processing in which a computer searches, from among a plurality of goods names, a goods name (a goods purchased by the customer) (search target item) associated with a customer identification number specified from among a plurality of customer identification numbers (relation items). Therefore, the relationship between the relation item and the search target item is reverse of that of the example of the Embodiment 1. Hereinafter, the description of the Embodiment 2 will be made focusing on differences from the Embodiment 1.

The Embodiment 2 will be described with reference to FIG. 17 to FIG. 21 used in the effect confirmation test of the Embodiment 1 described above.

That is, in the Embodiment 2, the goods names (the search target items) are two of the goods name a and the goods name b, the customer identification numbers (the relation items) are 60,000 of 1 to 60000, and the goods name a is associated with 40,000 of the customer identification numbers 1 to 40000 and the goods name b is associated with 40,000 of the customer identification numbers 20001 to 60000. Further, in the Embodiment 2, two goods names a, b (the search target items) are grouped into the upper item W. The data table used in the Embodiment 2 is the data table shown in FIG. 20 (hereinafter referred to as "sixth data table") and the data table shown in FIG. 21 (hereinafter referred to as "seventh data table").

As described above, the sixth data table shown in FIG. 20 is a data in which the upper item W is associated with the customer identification numbers 20001 to 40000, among the customer identification numbers 1 to 60000 (the relation items), related to all of the two goods names a, b (the search target items) associated with the upper item W. The sixth data table is stored in the storage portion 101*b*, and the computing portion 101*a* can perform a search from the sixth data table by executing a search program.

The seventh data table shown in FIG. 21 is a data in which the goods names a, b (the search target items) is associated with the customer identification numbers 1 to 20000 and 40001 to 60000 which are not included in the sixth data table, among the customer identification numbers 1 to 60000 (the relation items). The seventh data table is stored in the storage portion 101b, and the computing portion 101a can perform a search from the seventh data table by executing a search program.

Figure 22:
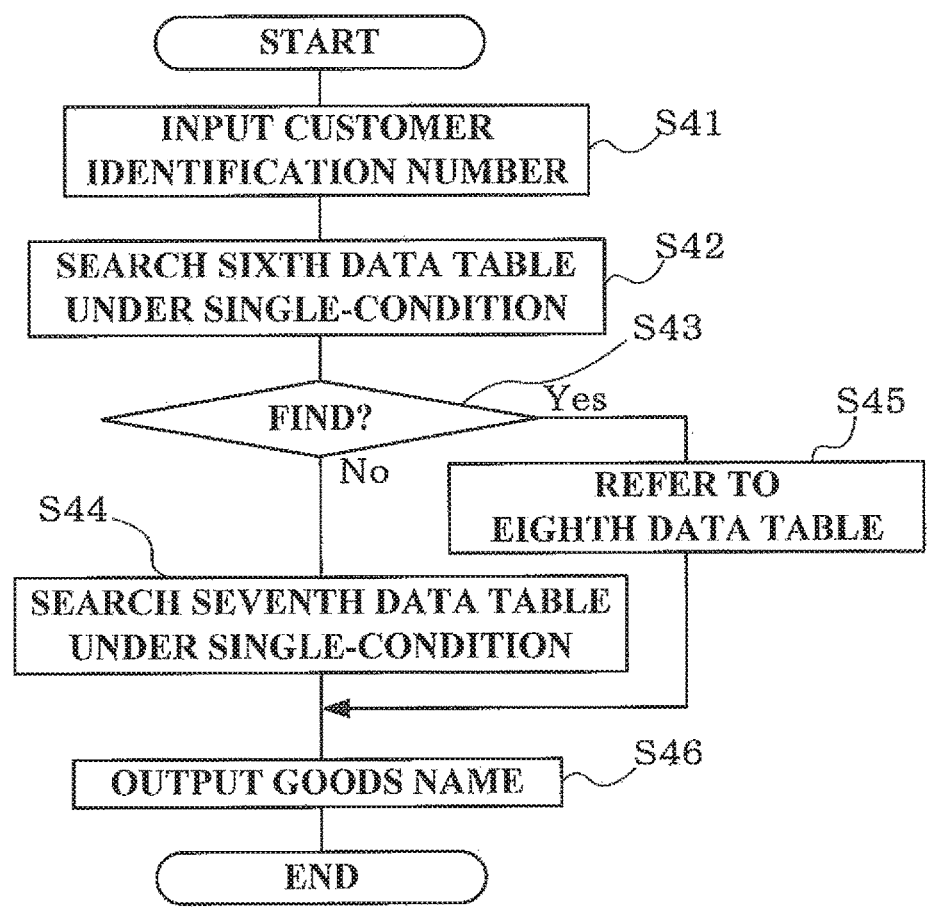
FIG. 22 is a flowchart showing a flow of search processing under a single condition in an Embodiment 2.

FIG. 22 is a flowchart showing a flow of search processing under a single condition in the Embodiment 2.

For example, consider a case where a goods name that has been purchased by a customer corresponding to the customer identification number 999 is searched under a single condition of the customer identification number 999. When the customer identification number 999 is input by an user operating the input devices 103, 104 or the like (S41), the computing portion 101a executes the search program and, first, the upper item W associated with the customer identification number 999 is searched under a single condition from the entire sixth data table shown in FIG. 20 (S42).

Here, since the customer identification number 999 is not associated with the upper item W, the upper item W associated with the customer identification number 999 is not found in the search processing for the sixth data table (No in S43). Therefore, the computing portion 101a searches the goods name associated with the customer identification number 999 from the entire seventh data table shown in FIG. 21 under the single condition (S44). As a result, since the goods name a associated with the customer identification number 999 is found, the goods name a related to the search result is output (S46).

On the other hand, if the customer identification number 999 is associated with the upper item W, the upper item W associated with the customer identification number 999 is found in the search processing for the sixth data table (Yes in S43). In this case, the computing portion 101a refers to the eighth data table shown in FIG. 18 (S45), extracts the goods names a, b associated with the upper item W, and outputs them as a search result (S46).

According to the Embodiment 2, the customer identification numbers (the relation items) included in the sixth data table and the customer identification numbers (the relation items) included in the seventh data table have an exclusive relationship. Thus, when there is an upper item associated with one specified customer identification number 999 (the relation item), the search processing is completed only by searching the upper item associated with the one customer identification number 999 under the single condition from the sixth data table shown in FIG. 20 (without performing the search processing for the seventh data table). The sixth data table does not include records in which the customer identification number (the relation item) included in the seventh data table and the goods name (the search target item) are associated with each other, so the number of records to be searched is small and the search processing speed can speed up significantly.

Further, when there is no upper item associated with one specified customer identification number 999 (the relation item), the search processing is performed for both the sixth data table shown in FIG. 20 and the seventh data table shown in FIG. 21. Since the total number of records at this time is small compared to the conventional case where the search processing is performed for the data table such as the table shown in FIG. 17, the search processing speed can be increased.

In the Embodiment 2, the sixth data table in which the number of records is relatively small is first searched, but the seventh data table may be searched first. In this case, when there is no upper item associated with the one specified customer identification number 999 (the relation item), the search processing is completed only by searching a goods name associated with the one customer identification number 999 under the single condition from the seventh data table shown in FIG. 21 (without performing the search processing for the sixth data table), so the search processing speed can speed up significantly.

Next, an effect confirmation test in the Embodiment 2 will be described.

Also in the present effect confirmation test, the same data table as the effect confirmation test in Embodiment 1 described above is used, a test was performed to compare Case 1 in which search processing is performed on a data table such as the table shown in FIG. 17, Case 2 in which search processing is performed on a data table shown in FIG. 19 and Case 3 (Embodiment 2) in which search processing is performed on the two data tables shown in FIG. 20 and FIG. 21. However, in the present effect confirmation test, the relationship between the relation item and the search target item is reverse of that of the effect confirmation test of the Embodiment 1, and the search processing in which the goods name is searched from one customer identification number under the single condition and the number of results is output is performed, and in each case, the time when the test is continuously repeated 100 times was measured as the search time.

In Case 2, the search time was shorter than in Case 1. This speed up of the search processing is realized mainly due to the reduction of the number of records to be searched, because the number in Case 1 is 80,000 for the number of records in the data table shown in FIG. 17, while the number in Case 2 is 60,000 for the number of records in the data table shown in FIG. 19. According to Case 2, the number of records to be searched is as small as ¾ (=60000/80000) compared to Case 1. When the search result is output, a process of searching the eighth data table shown in FIG. 18 is performed to extract the goods name from the upper item, but this search processing time is relatively short and may be ignored. Therefore, Case 2 theoretically has a search time of about ¾ that of Case 1.

On the other hand, in Case 3, since the number of records to be searched varies depending on the search condition and the search procedure, the shortening effect of the search time also varies depending on the search condition and the search procedure.

First, consider the case where the sixth data table shown in FIG. 20 is searched first. In this case, when the sixth data table is searched and a result is found, it is not necessary to search the seventh data table shown in FIG. 21. Therefore, the number of records to be searched is 20,000, which is the number of records in the sixth data table shown in FIG. 20, thereby the search time is theoretically ⅓ (=20000/60000) compared to Case 2 even if the process of searching the eighth data table shown in FIG. 18 due to extract the goods name from the upper item.

On the other hand, when the sixth data table is searched and a result is not found, the seventh data table shown in FIG. 21 also needs to be searched. Therefore, the number of records to be searched is 60,000, which is the total number of records in the sixth data table shown in FIG. 20 and the seventh data table shown in FIG. 21, as same as in Case 2. Therefore, the search time is theoretically the same as in Case 2.

In this case, an expected value of a shortening ratio of the search time of Case 3 to Case 2 is ⅞ (about 78%)=⅓ (a probability of finding a result by searching the sixth data table)×⅓ (a theoretical shortening rate of the search time of Case 3 to Case 2 in that case)+⅔ (a probability of not finding a result by searching the sixth data table)×1 (a theoretical shortening rate of the search time of Case 3 to Case 2 in that case).

Next, consider the case where the seventh data table shown in FIG. 21 is searched first. In this case, when the seventh data table is searched and a result is found, it is not necessary to search the sixth data table shown in FIG. 20. Therefore, the number of records to be searched is 40,000, which is the number of records in the seventh data table shown in FIG. 21, so that the search time is theoretically ⅔ (=40000/60000) compared to Case 2.

On the other hand, when the seventh data table is searched and a result is not found, the sixth data table shown in FIG. 20 also needs to be searched. Therefore, the number of records to be searched is 60,000, which is the total number of records in the seventh data table shown in FIG. 21 and the sixth data table shown in FIG. 20, as same as in Case 2. Therefore, the search time is theoretically the same as in Case 2.

In this case, the expected value of the shortening ratio of the search time of Case 3 to Case 2 is ⅞ (about 78%)=⅔ (a probability of finding a result by searching the seventh data table)×⅔ (a theoretical shortening rate of the search time of Case 3 to Case 2 in that case)+⅓ (a probability of not finding a result by searching the seventh data table)×1 (a theoretical shortening rate of the search time of Case 3 to Case 2 in that case).

In the measurement results of this effect confirmation test, Case 1 was 3.14 seconds, Case 2 was 2.37 seconds, and Case 3 was 1.82 seconds. In Case 2, the search time is about 75% for Case 1 and the speed up of the search is realized about 25% faster than Case 1. In Case 3, the search time is about 77% for Case 2 and the speed up of the search is realized about 23% faster than Case 2. These experimental results are almost the same as the theoretical values.

Embodiment 3

Next, still another embodiment of the present invention (hereinafter, this embodiment is referred to as "Embodiment 3") will be described.

FIG. 23A and FIG. 23B are explanatory diagrams showing a data structures of a third data table A as third data A and third data table B as third data B, which are obtained by dividing the third data table into two.

Similarly to the Embodiment 1, the Embodiment 3 also uses a database for managing goods purchase histories of customers in a store such as a supermarket or a department store, but is an example in which the third data table is divided into the third data table A and the third data table B as shown in FIG. 23A and FIG. 23B. That is, the third data table of the Embodiment 3 is stored in the storage portion 101*b* in a state of being divided into the third data table A and the third data table B, and the computing portion 101*a* can search from the third data table A and the third data table B (hereinafter, these are collectively referred to as "third data table") by executing the search program. Hereinafter, the description of the Embodiment 3 will be made focusing on differences from the Embodiment 1.

A update method (manufacturing method) of a database having a data structure in the Embodiment 3 will be described.

When new data (record) is input, it may be necessary to perform a second data table adding step in which a record included in the third data table is deleted and a record is added into the second data table. For example, there is a case where a record of the customer identification number 3 and the goods name a is newly input into the third data table including the records of the customer identification number 3 and the goods name b. In this case, the goods name a and the goods name b are grouped by the upper item W as shown in the first data table, thereby, as a result of adding the new record, the customer identification number 3 is related to all of the goods names a, b associated with the same upper item W. As a result, it is necessary to newly add a record in which the upper item W is associated with the customer identification number 3 into the second data table. And in connection with this, it is necessary to delete the record of the customer identification number 3 and the goods name b which were contained in the third data table from the third data table.

In carrying out such a second data table adding step, it is necessary to decide, for each new record to be input, whether or not the above second data table adding step (a step in which a record is added into the second data table and a record contained in the third data table is deleted) needs to be carried out. In this decision, it is necessary to search the record included in the third data table based on the new record and decide whether the second data table adding step is necessary, and when the number of records included in the third data increases, the search for the third data table takes time and the database update process takes time.

Therefore, in a data structure of the Embodiment 3, the third data table is divided into the third data table A and the third data table B as shown in FIG. 23A and FIG. 23B.

The third data table A includes, among the records included in the entire third data table, records in which the goods names d, . . . , as the relation items, not associated with any of the upper items W, X, Y, Z and the customer identification number 10, . . . as the search target items are associated with each other. In such a record, for example, even if a record of the same customer identification number 10 as the customer identification number 10 of the record is newly input, the goods name d of these records is not associated with the same upper item. Therefore, when a new record is input, it is not necessary to search for the third data table A, and in order to decide whether the second data table adding step described above is necessary, it is not necessary to search the third data table A.

On the other hand, the third data table B includes, among the records included in the entire third data table, records in which the goods names a, b, c, as the relation items, associated with upper items W, X, Y, Z and the customer identification numbers 3, 5, 8, . . . as the search target items are associated with each other. In such a record, the above-mentioned second data table adding step may be required, for example, regarding the same customer identification number 3 as the customer identification number 3 of these records, in the case for newly inputting a record of the goods name a which is associated with the same upper item when it is combined with the goods name b of the record existing in the third data table. Therefore, when a new record is input, it is necessary to search the third data table B to decide whether the second data table adding step is necessary.

As described above, in the Embodiment 3, when it is decided whether or not the second data table adding step described above is necessary, records that need not be searched are collected in the third data table A, thereby it is sufficient to search only the third data table B which is a part of the third data table, not the entire third data table. Therefore, since the number of records to be searched is smaller than in a conventional database in which the entire third data table needs to be searched, the search time is shortened and the time required for the database update process can be shortened.

In particular, in the third data table B of the Embodiment 3, when it is decided that the second data table adding step is necessary, the target record is deleted and the number of records decreases. Therefore, even if many records are input, the number of records in the third data table B does not increase significantly, and the effect of shortening the database update process time is temporally maintained.

On the other hand, the third data table B may include records that do not need to be searched to decide whether the second data table adding step is necessary when a new record is input. In this case, the number of records to be searched increases as the third data table B includes unnecessary records for the search, and the search time becomes longer, which is disadvantageous for shortening the time required for the database update process. However, such a record unnecessary for the search may be included in the third data table B for some reason, and even if such a record is included, the number of records to be searched is smaller than that of the conventional database necessary to search the entire third data table, so the shortening of the time necessary to the database update process is realized.

Figure 24:
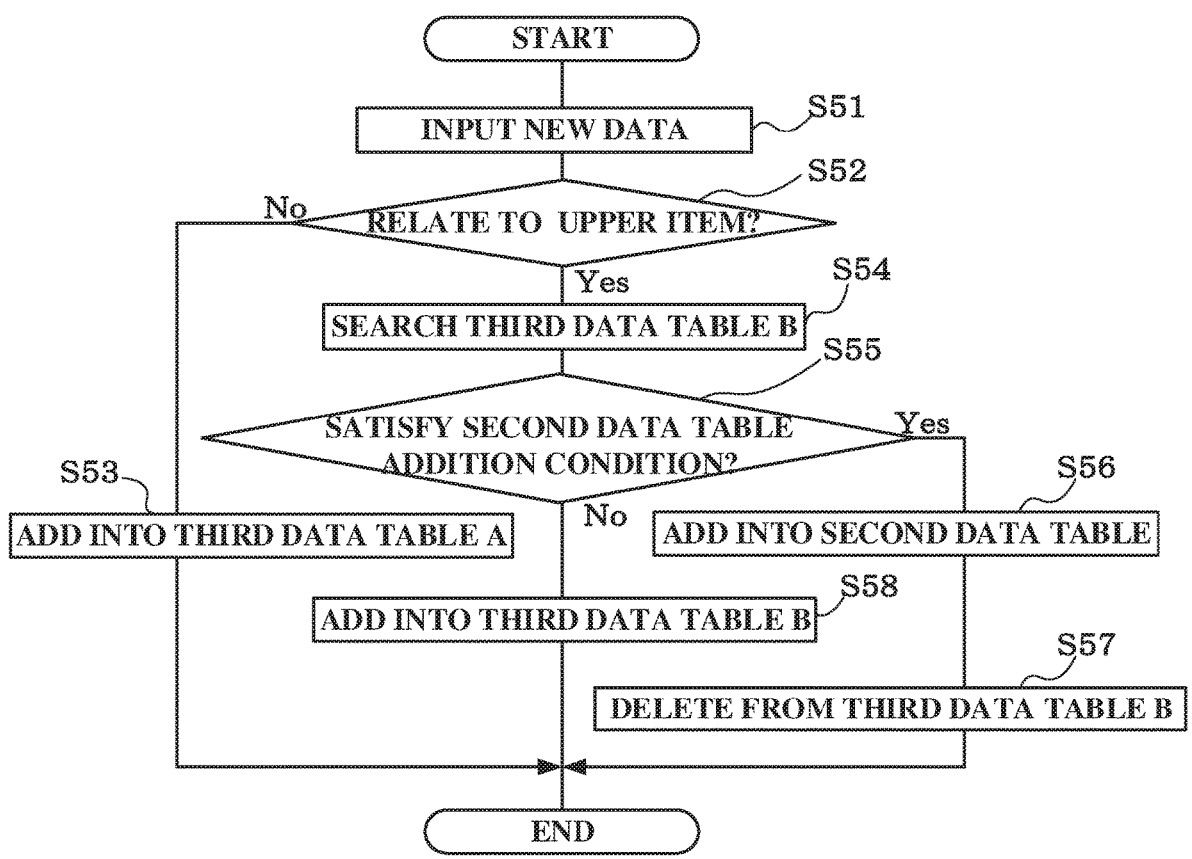
FIG. 24 is a flowchart showing a flow of an adding step of a database update process in the Embodiment 3.

FIG. 24 is a flowchart showing a flow of the database update process (the adding step) in the Embodiment 3.

When new data (a record of a customer identification number (the search target item) and a goods name (the relation item) related thereto) is input to the information search apparatus 100 functioning as a database manufacturing apparatus (update apparatus) (S51), the computing portion 101a becomes adding means by executing a database manufacturing program, and an adding step of adding new record to the database in the storage portion 101b is performed. Specifically, first, it is decided whether the goods name (the relation item) related to the input data (record) is associated with any of the upper items W, X, Y, Z (S52).

If the goods name of the input record is not associated with any of the upper items W, X, Y, Z in the decision of the processing step S52 (No in S52), the input record is added into the third data table A (S53). Because, in such a record, even if a record of the same customer identification number as the customer identification number of the record is input later, a goods name associated with this customer identification number is not associated with all the goods names associated with the same upper item.

In addition, if the goods name of the input record is associated with any of the upper items W, X, Y, Z in the decision of the processing step S52 (Yes in S52), the third data table B is next searched (S54). In this search, the third data table B is searched for a record having the same customer identification number as the customer identification number of the input record. Then, it is decided whether or not a second data table addition condition that the goods name of the record extracted by the search and the goods name of the input record are included in all of the goods names related to the same upper item is satisfied (S55).

If it is decided in the processing step S55 that the second data table addition condition is satisfied (Yes in S55), a processing of adding a record, into the second data table, in which the upper item of which all the goods names are composed of the goods names of the records extracted by the search and the goods name of the input record and the customer identification number of the input record are associated with each other is performed (S56). And a processing in which the record extracted from the third data table B is deleted from the third data table B is performed (S57). On the other hand, when it is decided in the processing step S55 that the second data table addition condition is not satisfied (No in S55), a processing for adding the input record into the third data table B is performed (S58).

In the Embodiment 3, by performing the above-described database update process (adding step), when it is decided whether or not the second data table adding step (S56, S57) described above is necessary (S54, S55), it is sufficient to search only the third data table B which is a part of the third data table. Therefore, since the number of records to be searched is smaller than in the conventional database in which the whole of the third data table needs to be searched, the search time is shortened and the time required for the database update process can be shortened.

In particular, in the third data table B of the Embodiment 3, when it is decided that the second data table adding step (S56, S57) is necessary, the target record is deleted and the number of records decreases. Therefore, even if many records are input, the number of records in the third data table B does not increase significantly, and the effect of shortening the database update process time is temporally maintained.

Next, a database update process (updating step) in the Embodiment 3 will be described.

As shown in FIG. 11, when new data is input to the information search apparatus 100 functioning as a database update device (manufacturing device) (S31), in the Embodiment 3, the computing portion 101a performs the following update process by executing the database update program in combination with the adding step (S51 to S58) for adding the new data into the database in the storage portion 101b, as described above.

In the updating step, first, it is decided whether or not the upper item creation condition for grouping two or more predetermined goods names (the relation items) into upper item is satisfied (S32). This upper item creation condition can be appropriately set as described above. At this time, if the upper item creation condition is not satisfied by the new data input (No in S32), the above-mentioned adding step (S51 to S58) is performed based on the existing upper item. That is, the computing portion 101a performs a update process (the second data table adding step) in which a record of the customer identification number newly associated with the existing upper item by the new data input is newly added into the second data table shown in FIG. 6 (S35), and an update process (the second data table adding step) in which a record corresponding to the record added into the second data table is deleted from the third data table B shown in FIG. 23B (S36). In addition, with regard to the records of the customer identification numbers that are not newly associated with the existing upper item by the new data input, for the records of the customer identification numbers related to the goods names not included in any upper items, the update process (the adding step) to be added into the third data table A shown in FIG. 23A is performed (S36), and for the records of the customer identification numbers related to the goods names included in any upper item, the update process (the adding step) to be added into the third data table B shown in FIG. 23B is performed (S36).

On the other hand, when the upper item creation condition is satisfied by the new data input (Yes in S32), a new upper item corresponding to this upper item creation condition is created (S33). For example, in the case where the upper item creation condition is a condition that the number of customer identification numbers (the search target items) related to all of two or more goods names (the relation items) is a predetermined number or more, if the number of customer identification numbers (the search target items) reaches the predetermined number or more by new data input, the new upper item is created and the two or more goods names (the relation items) are grouped by the new upper item. Then, an update process (update step) is performed to add a record in which the new upper item is associated with these two or more goods names (the relation items) into the first database shown in FIG. 4 (S34).

Subsequently, the update process (the second data table adding step) is performed to newly add the record of the customer identification number newly associated with the existing upper item or the new upper item by the new data input into the second data table shown in FIG. 6 (S35), and the update process (the second data table adding step) is performed to delete the record corresponding to the record added into the second data table from the third data table A and the third data table B shown in FIG. 23A and FIG. 23B (S36). In addition, with regard to the records of the customer identification numbers that are not newly associated with the existing upper item or the new upper item by the new data input, for the records of the customer identification numbers related to the goods names not included in any upper items, the update process (the adding step) to be added into the third data table A shown in FIG. 23A is performed (S36), and for the records of the customer identification numbers related to the goods names included in any upper item, the update process (the adding step) to be added into the third data table B shown in FIG. 23B is performed (S36).

By executing the database update process (updating step) as described above, the search processing can be performed by using the database in which the latest data appropriately grouped into the upper items is managed by each data table described above. Moreover, when the upper item creation condition is satisfied by the new data input, a new upper item is created and the database including the new upper item is updated. As a result, the latest data is grouped into appropriate upper items, and the search processing using the database managed by each data table described above is realized.

Next, an effect confirmation test in the Embodiment 3 will be described.

This effect confirmation test was performed in an example in which the goods names (the relation items) are four of goods names a, b, c, d, the customer identification numbers (the search target items) are 1,000 of 1 to 1000, and the goods name a is associated with 500 of the customer identification number 1 to 500, the goods name b is associated with 800 of the customer identification numbers 1 to 800, the goods name c is 800 of the customer identification numbers 1 to 500, 601 to 900, and the goods name d is associated with 1,000 of the customer identification numbers 1 to 1000. Further, the upper item in this effect confirmation test was made only into the upper item Z which grouped three goods names a, b, c (the relation items).

Figure 25:
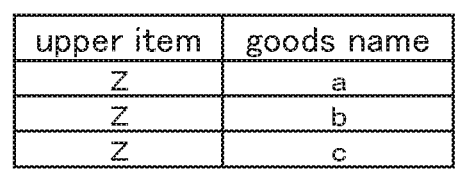

FIG. 25 shows a first data table, in the present effect confirmation test, in which the goods names a, b, c (the relation items) are associated with the upper item Z, and corresponds to the first data table shown in FIG. 4 in the Embodiment 3 described above.

FIG. 26 shows a data in which, among the customer identification numbers 1 to 1000 (the search target items), the customer identification numbers 1 to 500 related to all of the three goods names a, b, c (the relation items) associated with the upper item Z are associated with the upper item Z, and corresponds to the second data table shown in FIG. 6 in the Embodiment 3 described above.

FIG. 27 shows a data in which, among the customer identification numbers 1 to 1000 (the search target items), the customer identification numbers 1 to 1000 related to the goods name d (the relation item) not associated with any upper item Z are associated with the goods name d, and corresponds to the third data table A shown in FIG. 23A in the Embodiment 3 described above.

FIG. 28 shows a data in which, among the customer identification numbers 1 to 1000 (the search target items), the customer identification number 501~800, 601 to 900 related to only a part of goods names a, b, c (the relation items) associated with the same upper item Z are associated with the goods names b, c (the relation items) corresponding to each, and corresponds to the third data table B shown in FIG. 23B in the Embodiment 3 described above.

Also, for comparison, FIG. 29 shows one data table (the third data table) in which the third data table A shown in FIG. 27 and the third data table B shown in FIG. 28 are combined.

In the present effect confirmation test, an experiment was performed to compare Case A (Embodiment 3) in which a database update process is performed using, as the third data table, a data table dividing into the third data table A shown in FIG. 27 and the third data table B shown in FIG. 28, and Case B (comparative example) in which a database update process is performed using the single (non-divided) third data table shown in FIG. 29. In the update process of the effect confirmation test, the database is updated by inputting 101 new records in which the goods name a and the customer identification numbers 750 to 850 are associated with each other. The order of adding the records was in ascending order of the customer identification numbers.

Each data (record) was prepared as a separate text file (CSV file), and the adding step of the data was performed using a program created in C programming language. An operation of this program is merely a data addition processing with regard to the update process for the second data table shown in FIG. 26 and the third data table A shown in FIG. 27 accompanied by data addition. On the other hand, the update process for the third data table B shown in FIG. 28 or the third data table shown in FIG. 29 may be accompanied by deletion of data. Therefore, in such a case, a process in which, after deleting necessary data, all data of the corresponding text file is once deleted and thereafter all updated data is newly written was performed.

Other main conditions of this effect confirmation test are as follows.

Information search apparatus: Fujitsu SELSIUS W510
Operating system: Windows 10
C programming language compiler: Borland C The second data table after the effect confirmation test was updated from the state before the test shown in FIG. 26 to the state shown in FIG. 30 in both Case A according to the Embodiment 3 and Case B according to the comparative example. That is, by newly inputting the records of the customer identification numbers 750 to 800 associated with the goods name a, the records of the customer identification numbers 750 to 800 associated with the goods name b and the records of the customer identification numbers 750 to 800 associated with the goods name c, among the records included in the third data table B (Embodiment 3) shown in FIG. 28 and the third data table (the comparative example) shown in FIG. 29, are collected into the upper item Z of the goods names a, b, c by combining with the new record concerning the goods name a of the same customer identification number. As a result, the records of the customer identification numbers 750 to 800 associated with the upper item Z are added into the second data table before the test shown in FIG. 26, and the second data table after the test shown in FIG. 30 was obtained.

Further, although the third data table A (Embodiment 3) after the present effect confirmation test is not updated, the third data table B (Embodiment 3) after the present effect confirmation test is updated from the state before the test shown in FIG. 28 to the state shown in FIG. 31. That is, by newly inputting the record of the customer identification number 750 to 800 associated with the goods name a, the goods names b, c is collected into the upper item Z as described above and added into the second data table, thereby the record of the customer identification number 750-800 associated with the name b and the record of the customer identification number 750-800 associated with the item name c are deleted from the third data table B, and the records of the customer identification numbers 801 to 850 associated with the goods name a are added, so that the third data table B in the state shown in FIG. 31 was obtained.

On the other hand, the third data table (the comparative example) after the present effect confirmation test was updated from the state before the test shown in FIG. 29 to the state shown in FIG. 32. That is, by newly inputting the record of the customer identification number 750 to 800 associated with the goods name a, the goods names b, c is collected into the upper item Z as described above and added into the second data table, thereby the record of the customer identification number 750-800 associated with the name b and the record of the customer identification number 750-800 associated with the item name c are deleted from the third data table, and the records of the customer identification numbers 801 to 850 associated with the goods name a are added, so that the third data table in the state shown in FIG. 32 was obtained.

In the effect confirmation test, the update process time of the database by the adding step of 101 new data was about 62 milliseconds in Case A according to the Embodiment 3 in which the third data table is divided, and about 109 milliseconds in Case B according to the comparative example in which the third data table is not divided. As a result, in Case A according to the Embodiment 3, by dividing the third data table, the number of records of the third data table B to be searched at a time of the adding step of the 101 new data is smaller than the number of records of the entire third database according to the comparative example, so that the search time of the adding step is shortened and the processing time is shortened.

Embodiment 4

Next, still another embodiment of the present invention (hereinafter, this embodiment is referred to as "embodiment 4") will be described.

Similarly to the Embodiment 3, the Embodiment 4 also uses a database for managing goods purchase histories of customers in a store such as a supermarket or a department store, but is an example of a search processing in which a computer searches, from among a plurality of goods names, a goods name (a goods purchased by the customer) (search target item) associated with a customer identification number specified from among a plurality of customer identification numbers (relation items). Therefore, the relationship between the relation item and the search target item is reverse of that of the example of the Embodiment 3.

Hereinafter, the description of the Embodiment 4 will be made focusing on differences from the Embodiment 3.

The Embodiment 4 will be described with reference to FIG. 33 to FIG. 37.

That is, in the Embodiment 4, the goods names (the search target items) are three of goods name a, goods name b and goods name c, customer identification numbers (the relation items) are 70,000 of 1 to 70000, and the goods name a is associated with 40,000 of the customer identification numbers 1 to 40000, the goods name b is associated with 40,000 of the customer identification numbers 20001 to 60000 and the goods name c is associated with 10,000 of the customer identification number 60001 to 70000. Further, in the Embodiment 4, two goods names a, b (the search target items) are grouped into the upper item W. The data table used in the Embodiment 4 is the data table shown in FIG. 36 (hereinafter referred to as "sixth data table"), the data table shown in FIG. 37A (hereinafter referred to as "seventh data table A"), the data table shown in FIG. 37B (hereinafter referred to as "seventh data table B") and the data table shown in FIG. 34 (hereinafter referred to as "eighth data table"). In the following description, the seventh data table A and the seventh data table B are collectively referred to as a "seventh data table".

As described above, the sixth data table shown in FIG. 36 is data in which the upper item W is associated with the customer identification numbers 20001 to 40000, among the customer identification numbers 1 to 70000 (the relation items), related to all of the two goods names a, b (the search target items) associated with the upper item W. The sixth data table is stored in the storage portion 101b, and the computing portion 101a can perform a search from the sixth data table by executing a search program.

The seventh data table is a data in which the goods names a, b, c (the search target items) is associated with the customer identification numbers 1 to 20000, 40001 to 70000 which are not included in the sixth data table, among the customer identification numbers 1 to 70000 (the relation items). The seventh data table of the Embodiment 4 is stored in the storage portion 101b in a state of being divided into the seventh data table A and the seventh data table B as shown in FIG. 37A and FIG. 37B, and the computing portion 101a can perform a search from the seventh data table A and the seventh data table B (that is, the seventh data table) by executing a search program.

The search processing under a single condition in the Embodiment 4 will be described along the flowchart shown in FIG. 22.

For example, consider a case where a goods name that has been purchased by a customer corresponding to the customer identification number 999 is searched under a single condition of the customer identification number 999. When the customer identification number 999 is input by an user operating the input devices 103, 104 or the like (S41), the computing portion 101a executes the search program and, first, the upper item W associated with the customer identification number 999 is searched under a single condition from the entire sixth data table shown in FIG. 36 (S42).

Here, since the customer identification number 999 is not associated with the upper item W, the upper item W associated with the customer identification number 999 is not found in the search processing for the sixth data table (No in S43). Therefore, the computing portion 101a searches the goods name associated with the customer identification number 999 from the entire seventh data table shown in FIG. 37A and FIG. 37B under the single condition (S44). As a result, since the goods name a associated with the customer identification number 999 is found, the goods name a related to the search result is output (S46).

On the other hand, if the customer identification number 999 is associated with the upper item W, the upper item W associated with the customer identification number 999 is found in the search processing for the sixth data table (Yes in S43). In this case, the computing portion 101a refers to the eighth data table shown in FIG. 34 (S45), extracts the goods names a, b associated with the upper item W, and outputs them as a search result (S46).

According to the Embodiment 4, the customer identification numbers (the relation items) included in the sixth data table and the customer identification numbers (the relation items) included in the seventh data table have an exclusive relationship. Thus, when there is an upper item associated with one specified customer identification number 999 (the relation item), the search processing is completed only by searching the upper item associated with the one customer identification number 999 under the single condition from the sixth data table shown in FIG. 36 (without performing the search processing for the seventh data table). The sixth data table does not include records in which the customer identification number (the relation item) included in the seventh data table and the goods name (the search target item) are associated with each other, so the number of records to be searched is small and the search processing speed can speed up significantly.

Further, when there is no upper item associated with one specified customer identification number 999 (the relation item), the search processing is performed for both the sixth data table shown in FIG. 36 and the seventh data table shown in FIG. 37A and FIG. 37B. Since the total number of records at this time is small compared to the conventional case where the search processing is performed for the data table such as the table shown in FIG. 33, the search processing speed can be increased.

In the Embodiment 4, the sixth data table in which the number of records is relatively small is first searched, but the seventh data table may be searched first. In this case, when there is no upper item associated with the one specified customer identification number 999 (the relation item), the search processing is completed only by searching a goods name associated with the one customer identification number 999 under the single condition from the seventh data table shown in FIG. 37A and FIG. 37B (without performing the search processing for the sixth data table), so the search processing speed can speed up significantly.

Next, an update method (manufacturing method) of the database having the data structure in the Embodiment 4 will be described.

Also in the Embodiment 4, the customer identification number and the goods name purchased by the customers are input by manual input of the user using the input devices 103, 104, so that the sixth data table shown in FIG. 36 or the seventh data table shown in FIG. 37A and FIG. 37B (that is, the seventh data table A and the seventh data table B shown in FIG. 37A and FIG. 37B) is updated. The new data input method is not limited to such manual input, as in the Embodiment 3 described above.

Also in the Embodiment 4, when new data (record) is input, it may be necessary to perform a sixth data table adding step in which a record included in the seventh data table is deleted and a record is added into the sixth data table. For example, there is a case where a record of the customer identification number 1 and the goods name b is newly input into the seventh data table including the records of the customer identification number 1 and the goods name a. In this case, the goods name a and the goods name b are grouped by the upper item W as shown in the eighth data table shown in FIG. 34, thereby, as a result of adding the new record, the customer identification number 1 is related to all of the goods names a, b associated with the same upper item W. As a result, it is necessary to newly add a record in which the upper item W is associated with the customer identification number 1 into the sixth data table. And in connection with this, it is necessary to delete the record of the customer identification number 1 and the goods name a which were contained in the seventh data table from the seventh data table.

In carrying out such a sixth data table adding step, it is necessary to decide, for each new record to be input, whether or not the above sixth data table adding step (a step in which a record is added into the sixth data table and a record contained in the seventh data table is deleted) needs to be carried out. In this decision, it is necessary to search the record included in the seventh data table based on the new record and decide whether the sixth data table adding step is necessary, and when the number of records included in the seventh data increases, the search for the seventh data table takes time and the database update process takes time.

Therefore, in a data structure of the Embodiment 4, the seventh data table is divided into the seventh data table A and the seventh data table B as shown in FIG. 37A and FIG. 37B.

The seventh data table A includes, among the records included in the entire seventh data table, records in which the goods name c as the search target item not associated with any upper item W and the customer identification numbers 60001 to 70000 as the relation items are associated with each other. In such a record, for example, even if a record of the same customer identification number 70000 as the customer identification number 70000 of the record is newly input, the goods name c of these records is not associated with the same upper item. Therefore, when a new record is input, it is not necessary to search for the seventh data table A, and in order to decide whether the sixth data table adding step described above is necessary, it is not necessary to search the seventh data table A.

On the other hand, the seventh data table B includes, among the records included in the entire seventh data table, records in which the goods names a, b, as the search target items, associated with the upper item W and the customer identification numbers 1 to 20000 and 40001 to 60000 as the relation items are associated with each other. In such a record, the above-mentioned sixth data table adding step may be required, for example, regarding the same customer identification number 20000 as the customer identification number 20000 of these records, in the case for newly inputting a record of the goods name b which is associated with the same upper item W when it is combined with the goods name a of the record existing in the seventh data table B. Therefore, when a new record is input, it is necessary to search the seventh data table B to decide whether the sixth data table adding step is necessary.

As described above, in the Embodiment 4, when it is decided whether or not the sixth data table adding step described above is necessary, records that need not be searched are collected in the seventh data table A, thereby it is sufficient to search only the seventh data table B which is a part of the seventh data table, not the entire seventh data table. Therefore, since the number of records to be searched is smaller than in a conventional database in which the entire seventh data table needs to be searched, the search time is shortened and the time required for the database update process can be shortened.

In particular, in the seventh data table B of the Embodiment 4, when it is decided that the sixth data table adding step is necessary, the target record is deleted and the number of records decreases. Therefore, even if many records are input, the number of records in the seventh data table B does not increase significantly, and the effect of shortening the database update process time is temporally maintained.

On the other hand, the seventh data table B may include records that do not need to be searched to decide whether the sixth data table adding step is necessary when a new record is input. In this case, the number of records to be searched increases as the seventh data table B includes unnecessary records for the search, and the search time becomes longer, which is disadvantageous for shortening the time required for the database update process. However, such a record unnecessary for the search may be included in the seventh data table B for some reason, and even if such a record is included, the number of records to be searched is smaller than that of the conventional database necessary to search the entire seventh data table, so the shortening of the time necessary to the database update process is realized.

In the Embodiment 3, 4 described above, although the above-described adding step is performed each time one new data (record) is input, the above-described adding step may be performed after a plurality of new data (records) are input. In this case, for example, a temporary storage data table for temporarily storing input new data is provided, and when a predetermined update timing (for example, a predetermined timing once a day, a timing when the number of records stored in the temporary storage data table reaches a specified number, etc.) comes, the above-mentioned adding step is performed for the records stored in the temporary storage data table, and the database update process is performed.

However, in this case, it is necessary to perform a search the temporary storage data table in any of the above-described search processing, but since the number of records in the temporary storage data table is limited, a situation such that the search processing time significantly increases is not occurred.

Further, in the above-described Embodiment 3, 4, each time one new data (record) is input, only a part of the above-described adding step may be performed and the remaining adding step may be performed after a plurality of new data (records) are input.

Describing the adding step shown in FIG. 24 as an example, when new data is input (S51), a processing step S52 is performed to decide whether or not the goods name (the relation item) related to the input data (record) is associated with any of the upper items W, X, Y, Z. Then, if the goods name of the input record is not associated with any of the upper items W, X, Y, Z (No in S52), a process for adding the input record into the third data table A (S53). On the other hand, if it is decided at processing step S52 that the goods name of the input record is associated with any of the upper items W, X, Y, Z (Yes at S52), a search for the third data table B (S54) is not performed, and the input record is added into the temporary storage data table or the third data table B. This is the end of the adding step performed when new data is input.

Thereafter, when the predetermined update timing comes, the third data table B is searched for a record having the same customer identification number as the customer identification number corresponding to each record added to the temporary storage data table or the third data table B (S54). Then, as a result of the search, with regard to the records satisfying the second data table addition condition (Yes of S55), a process for adding into the second data table is performed (S56) and a process for deleting from the third data table B is performed (S57). On the other hand, with regard to the records not satisfying the second data table addition condition (No in S55), a process for saving in the third data table B is performed (S58).

In the above embodiments, means realized by software such as a computer program may be realized by hardware such as a circuit or a chip, and means realized by hardware such as a circuit or a chip may be realized by software such as a computer program.

REFERENCE SIGNS LIST

100: Information Search Apparatus
101*a*: Computing Portion
101*b*: Storage Portion
101: Apparatus Main Body
103, 104: Input Devices

The invention claimed is:

1. An information search apparatus for searching a search target item, from among search target items which includes first search target items, second search target items and third search target items, comprising:
   a central processing unit; and
   a storage device storing:
   first data in which each of first item group indices is uniquely associated with two or more of relation items, and none of the first item group indices is associated with only one of the two or more of relation items,
   second data in which each of the first search target items related to the two or more of the relation items in the first data, is associated with one or more of the first item group indices, and
   third data in which each of the second search target items, which is not related to any of the two or more of the relation items, is associated with one or more of the relation items, and each of the third search target items is associated with only one of or only a sub-combination of the two or more of the related items with which each of the first item group indices is uniquely associated,
   wherein when a search is performed under a first predetermined search condition in which specified one or more of the relation items are specified from among the relation items, the central processing unit refers to the first data, and when it is decided that there is an associated first item group index, which is associated with part or all of the specified one or more of the relation items, at least the second data is searched and when it is decided that there is not the associated first item group index, only the third data is searched.

2. The information search apparatus according to claim 1, wherein in the first data, the predetermined first item group index creation condition is satisfied.

3. The information search apparatus according to claim 1, wherein the storage device stores
   fourth data in which each of second item group indices is uniquely associated with two or more of the first item group indices, and
   fifth data in which each of the second item group indices is associated with one or more of the search target items related to the one or more of the relation items associated with one of the second item group indices, via the two or more of the first item group indices; and when a search is performed under a second predetermined search condition in which two or more of the relation items are specified from among the relation items, the central processing unit refers to the fourth data, and when it is decided that there is any of the second item group indices associated, via the two or more of the first item group indices, with the specified two or more of the relation items satisfying the second predetermined search condition, the fifth data is searched.

4. The information search apparatus according to claim 1, wherein when a search is performed under a third predetermined search condition in which two or more of the relation items are specified from among the relation items, the central processing unit refers to the first data, and when it is decided that there is one of the first item group indices associated with the specified two or more of the relation items satisfying the third predetermined search condition, the second data is searched and if it is decided that there is not the associated one of the first item group indices associated with the specified two or more of the relation items satisfying the third predetermined search condition, the third data is searched.

5. An information search apparatus for searching a search target item, from among search target items comprising:
a central processing unit; and
a storage device storing
eighth data in which each of item group indices is uniquely associated with two or more of the search target items,
sixth data in which each of the item group indices is associated with two or more of the relation items, none of the item group indices is associated with only one of the search target items,
seventh data in which each of other relation items other than the two or more of the relation items, is associated with one or more of the search target items so that the other relation items not included in the sixth data and the search target items related to the other relation items are associated with each other,
wherein the central processing unit refers to the sixth data and when it is decided that there is an associated item group index, which is associated with the specified one or more relation item, one or more associated search target items, which is associated with the associated item group index is extracted from the eighth data and is output as a search result, and the central processing unit refers to the seventh data, and when it is decided that there is a related search target item, which is related to the specified relation item, the related search target item is output as the search result.

6. A non-transitory computer readable medium storing a program which causes a computer to execute following steps of searching, from among search target items including first, second and third search target items, a matched search target item,
wherein a database stores first data in which each of first item group indices is uniquely associated with two or more of the relation items, and none of the first item group indices is associated with only one of the two or more of the relation items,
second data in which each of the first search target items related to the two or more of the relation items in the first data, is associated with one or more of the first item group indices, and third data in which each of the second search target items, which is not related to any of the two or more of the relation items, is associated with one or more of relation items, and each of the third search target items is associated with only one of or only a sub-combination of the two or more of the relation items with which each of the first item group indices is uniquely associated:

when the matched search target item associated with specified one or more relation item is searched under a predetermined search condition in which the specified one or more relation items are specified from among the relation items, referring to the first data, and searching at least the second data when there is an associated one or more of the first item group indices, which is associated with part or all of the specified one or more relation items, and searching only the third data when there is not the associated one of the first item group indices.

7. An apparatus for updating a database, which is used for an information search apparatus for searching a search target item, from among search target items which includes first search target items, second search target items and third search target items comprising:
a storage device which stores
first data in which each of first item group indices is uniquely associated with two or more of relation items, and none of the first item group indices is associated with only one of the two or more of the relation items,
second data in which each of the first search target items, which is related to the two or more of the relation items in the first data, is associated with one or more of the first item group indices, and
third data in which each of the second search target items, which is not associated with any of the first group item indices, is associated with one or more of the relation items, and each of the third search target items is associated with only one of or only a sub-combination of the two or more of the relation items,
means for adding the search target items and the relation items related thereto, and
means for updating the database by uniquely associating each of the first item group indices with the two or more of the relation items satisfying a predetermined first item group index creation condition.

8. An apparatus for updating a database, which is used for an information search apparatus for searching a search target item among search target items comprising:
a storage device which stores
sixth data in which each of item group indices, which is uniquely associated with two or more of the search target items, is associated with two or more of the relation items, which are related to the two or more of the search target items, any of the item group indices is not associated with only one of the search target items, and any of the relation items is not related to only one of the search target items,
seventh data in which each of other relation items other than the two or more of the relation items, is associated with one or more of the search target items so that the other relation items not included in the sixth data and the search target items related to the other relation item are associated with each other, and
eighth data in which each of the item group indices is uniquely associated with the two or more of the search target items,
means for adding the search target items and the relation items related thereto, and means for updating the database by uniquely associating each of the item group indices with the two or more of the search target items satisfying a predetermined item group index creation condition.

9. A method for updating a database, which is used for an information search apparatus for searching a search target item by using a computer from among search target items which includes first search target items, second search target items and third search target items
   wherein a storage device stores,
   first data in which each of item group indices is uniquely associated with two or more of relation items, and none of the item group indices is associated with only one of the two or more of the relation items,
   second data in which each of the first search target items related to the two or more of the relation items in the first data, is associated with one of the item group indices, and
   third data comprising third data A in which each of relation items not associated with any of the first item group indices, is associated with one or more of the second search target items, and third data B in which each of the third search target items is associated with only one of or only a sub-combination of the two or more of the relation items, which are associated with one of the item group indices, comprising:
   an inputting step of inputting a relation item to be input and a search target item which is associated with the relation item to be input,
   a deciding step of deciding whether the input relation item is associated with any of the item group indices, and
   an updating step in which,
   when the input relation item is not associated with any of the item group indices, a first record of the input relation item not associated with any of the item group indices and the input search target item associated therewith is added to the third data A; and
   when the input relation item is associated with one of the item group indices, only the third data B of the third data is searched for relation items related to the input search target item, and in a search of the third data B, when a rest of the two or more relation items, which is not the input relation items, is found in the third data B,
      a second record of relation between the input search target item and the one of the item group indices which is associated with the input relation item and the rest of the two or more relation items found in the third data B, is added to the second data, and
      a third record of relation between the rest of the two or more relation items and the input search target item which is associated with the rest of the two or more relation items, is deleted from the third data B, and
   in the search of the third data B, when the rest of the two or more relation items, which is not the input relation items, is not found in the third data B, a fourth record of relation between the input relation item and the input search target item which is associated with the input relation item, is added to the third data B.

10. A method for updating a database, which is used for an information search apparatus for searching a search target item by using a computer from among search target items which includes first search target items, second search target items and third search target items,
    wherein a storage device, which stores,
    eighth data in which each of item group indices is uniquely associated with two or more of the first search target items,
    sixth data in which each of the item group indices is uniquely associated with two or more of relation items, none of the item group indices is associated with only one of the search target items, and
    seventh data in which each of other relation items other than the two or more of the relation items is associated with one or more of the search target items, so that the other relation items not included in the sixth data and the search target items related to the other relation items are associated with each other,
    the seventh data comprises seventh data A in which each of the second search target items, which is not associated with any of the item group indices, is associated with one or more of the relation items, and seventh data B in which each of the third search target items is associated with only one of or only a sub-combination of the two or more of the relation items, which is associated with one of the item group indices, comprising: an inputting step of inputting a relation item to be added and a search target item which is associated with the relation item to be added,
    a deciding step of deciding whether the input search target item is associated with any of the item group indices, and
    an updating step in which,
    when the input search target item is not associated with any of the item group indices, a first record of relation between the input search target item not associated with any of the item group indices and the input relation item associated therewith is added to the seventh data A; and
    when the input search target item is associated with one of the item group indices, only the seventh data B of the seventh data is searched for search target items related to the input relation item,
    in a search of the seventh data B, when a rest of the two of more search target items, which is not the input search target item, is found in the seventh data B,
       a second record of relation between the input relation item and the one of the item group indices which is associated with the input search target item and the rest of two or more search target items found in the seventh data B, is added to the sixth data, and
       a third record of relation between the rest of two or more search target items found in the seventh data B and the input relation item, which is associated with the rest of two or more search target items, is deleted from the seventh data B, and p1 in the search of the seventh data B, when the rest of the two or more search target items, which is not the input search target item, is not found in the seventh data B, a fourth record of relation between the input search target item and the input relation item is added into the seventh data B.

11. The information search apparatus according to claim 2, wherein
    the storage device stores fourth data including second item group indices, in which each of the second item group indices is uniquely associated with two or more of the first item groups, and
    fifth data in which each of the second item group indices is associated with one or more of the search target items related to one or more of the relation items associated with one of the second item group indices, via two or more of the first item group indices; and
    when a search is performed under a second predetermined search condition in which two or more of the relation items are specified from among the plurality of relation items, the central processing unit refers to the fourth data, and when it is decided that there is any one of the second item group index associated, via the two or more of the first item group indices with the specified two or more of the relation items satisfying the second predetermined search condition, the fifth data is searched.

12. The information search apparatus according to claim 2, wherein when a search is performed under a third predetermined search condition in which specified two or more of the relation items are specified from among the relation items, the central processing unit refers to the first data, and when it is decided that there is the any one of the first item group indices associated with the specified two or more of relation items satisfying the third predetermined search condition, the second data is searched and when it is decided that there is not one of the first item group indices associated with the two or more of the relation items satisfying the third predetermined search condition, the third data is searched.

13. The information search apparatus according to claim 3, wherein when a search is performed under a third predetermined search condition in which specified two or more of the relation items are specified from among the relation items, the central processing unit refers to the first data, and when it is decided that there is any one of the first item group indices associated with the specified two or more relation items satisfying the third predetermined search condition, the second data is searched and when it is decided that there is not the one of the first item group indices associated with the specified two or more of the relation items satisfying the third predetermined search condition, the third data is searched.

* * * * *